(12) United States Patent
MacKay et al.

(10) Patent No.: US 11,922,756 B2
(45) Date of Patent: Mar. 5, 2024

(54) PARKING METER HAVING TOUCHSCREEN DISPLAY

(71) Applicant: J.J. MacKay Canada Limited, New Glasgow (CA)

(72) Inventors: George Allan MacKay, New Glasgow (CA); James George MacKay, Frasers Mountain (CA); Adrian Ignatius O'Neil, New Glasgow (CA); Gregory Emile Chauvin, Brookside (CA); Neil Stuart Erskine, Halifax (CA)

(73) Assignee: J.J. MacKay Canada Limited, New Glasgow (CA)

( * ) Notice: Subject to any disclaimer, the term of this patent is extended or adjusted under 35 U.S.C. 154(b) by 8 days.

(21) Appl. No.: 17/005,479

(22) Filed: Aug. 28, 2020

(65) Prior Publication Data

US 2020/0394867 A1    Dec. 17, 2020

Related U.S. Application Data

(63) Continuation-in-part of application No. 16/774,099, filed on Jan. 28, 2020.

(30) Foreign Application Priority Data

Jan. 30, 2019 (CA) ................................ CA 3031936

(51) Int. Cl.
*G07F 17/24* (2006.01)
*G06F 1/3231* (2019.01)
(Continued)

(52) U.S. Cl.
CPC ............ *G07F 17/24* (2013.01); *G06F 1/3231* (2013.01); *G06F 3/041* (2013.01);
(Continued)

(58) Field of Classification Search
CPC ........ G07F 9/009; G07F 17/248; G07F 17/24; G07F 17/242; G06F 1/3287;
(Continued)

(56) References Cited

U.S. PATENT DOCUMENTS

| 480,108 A | 8/1892 | Loch |
|---|---|---|
| 1,189,991 A | 7/1916 | Mugler |

(Continued)

FOREIGN PATENT DOCUMENTS

| AU | 4035701 | 9/2001 |
|---|---|---|
| AU | 200227724 A1 | 1/2003 |

(Continued)

OTHER PUBLICATIONS

Duncan Solutions "Single-Space Meters" brochure (2 pages); Rev. 04/06, 2006 Duncan Solutions, Inc.

(Continued)

*Primary Examiner* — Yaron Cohen
(74) *Attorney, Agent, or Firm* — Neal L. Slifkin; Harris Beach PLLC

(57) ABSTRACT

A parking meter may incorporate a touchscreen display assembly that uses a low-power wake trigger, which may be a proximity sensor overlaid on the display, that can power on the display and touch sensor when a user's proximity is detected. The parking meter may incorporate a replaceable panel insert that allows user interface components to be easily retrofitted or upgraded by simply replacing the panel insert. Additionally, the parking meter may incorporate multiple solar panels on the exterior of the parking meter.

15 Claims, 14 Drawing Sheets

(51) Int. Cl.
*G06F 3/041* (2006.01)
*G06F 3/04886* (2022.01)
*G06F 3/14* (2006.01)
*G06K 7/00* (2006.01)
*G06Q 20/18* (2012.01)
*G06Q 30/0283* (2023.01)

(52) U.S. Cl.
CPC ............ *G06F 3/04886* (2013.01); *G06F 3/14* (2013.01); *G06K 7/0021* (2013.01); *G06Q 20/18* (2013.01); *G06Q 30/0284* (2013.01)

(58) Field of Classification Search
CPC ........ G06F 1/3228; G06F 1/263; G06F 3/041; G06F 1/3231; G06F 3/0482; G06F 1/3293; G06F 1/3262; G06F 1/3215; G06F 3/14; G06F 1/3218; G06F 1/182; G06F 1/3265; G06F 3/0484; G06F 1/1601; G06F 3/04847; G06F 3/0412; G06F 3/0488; G06F 3/04886; G06F 3/041661; G06F 2203/04106; G06F 2203/04103; G06K 7/0021; G06Q 20/18; G06Q 30/0284; Y04S 50/14; Y02D 10/00
See application file for complete search history.

(56) References Cited

U.S. PATENT DOCUMENTS

| | | |
|---|---|---|
| 1,445,771 A | 2/1923 | Keplinger |
| 1,818,568 A | 8/1931 | Melick |
| D98,810 S | 3/1936 | Magee |
| D100,875 S | 8/1936 | Michaels et al. |
| D101,237 S | 9/1936 | Miller |
| D106,561 S | 10/1937 | Broussard et al. |
| D107,577 S | 12/1937 | McGay et al. |
| 2,118,318 A | 5/1938 | Magee |
| D112,677 S | 12/1938 | Broussard et al. |
| 2,161,046 A | 6/1939 | Rockols |
| D116,805 S | 9/1939 | Reznek et al. |
| 2,229,183 A | 1/1941 | Mitchell |
| 2,261,353 A | 11/1941 | Fedele |
| 2,289,838 A | 7/1942 | Herschede et al. |
| D152,294 S | 1/1949 | Siegel et al. |
| D152,587 S | 2/1949 | Brundage |
| D154,716 S | 8/1949 | Simpson |
| 2,483,805 A | 10/1949 | Broussard et al. |
| 2,495,784 A | 1/1950 | Starts |
| D161,888 S | 2/1951 | Wilkin |
| D162,698 S | 3/1951 | Teague |
| 2,546,433 A | 3/1951 | Dick |
| 2,547,272 A | 4/1951 | Lawson et al. |
| 2,550,433 A | 4/1951 | Tichenor |
| 2,570,920 A | 10/1951 | Clough et al. |
| D166,059 S | 2/1952 | Menhall |
| 2,594,388 A | 4/1952 | Broussard |
| 2,595,124 A | 4/1952 | Campbell |
| D166,753 S | 5/1952 | Jones |
| 2,596,122 A | 5/1952 | Broussard |
| 2,596,123 A | 5/1952 | Broussard |
| 2,596,124 A | 5/1952 | Broussard |
| 2,599,881 A | 6/1952 | Woodruff |
| 2,613,792 A | 10/1952 | Broussard et al. |
| 2,613,871 A | 10/1952 | Broussard et al. |
| 2,618,371 A | 11/1952 | Broussard |
| 2,633,960 A | 4/1953 | Broussard |
| D181,359 S | 11/1957 | Jones |
| 2,818,371 A | 12/1957 | Wessinger |
| 2,822,682 A | 2/1958 | Sollenberger |
| 2,832,506 A | 4/1958 | Hatcher |
| D189,106 S | 10/1960 | Leiderman |
| 2,956,525 A | 10/1960 | Blauvelt |
| 2,985,978 A | 5/1961 | Breen et al. |
| 2,988,191 A | 6/1961 | Grant |
| 2,995,230 A | 8/1961 | Moody et al. |
| 3,018,615 A | 1/1962 | Milton et al. |
| 3,046,774 A | 7/1962 | Glock |
| 3,056,544 A | 10/1962 | Sollenberger et al. |
| D199,270 S | 9/1964 | Michaels |
| D200,216 S | 2/1965 | Broussard et al. |
| 3,183,411 A | 5/1965 | Palfi |
| 3,199,321 A | 8/1965 | Soilenberger |
| 3,204,438 A | 9/1965 | Sollenberger |
| 3,208,061 A | 9/1965 | Gervasi et al. |
| 3,262,540 A | 7/1966 | Sollenberger et al. |
| 3,272,299 A | 9/1966 | Sollenberger et al. |
| 3,324,647 A | 6/1967 | Jedynak |
| 3,373,856 A | 3/1968 | Kusters et al. |
| 3,438,031 A | 4/1969 | Fathauer |
| 3,486,324 A | 12/1969 | Anderson |
| 3,519,113 A | 7/1970 | Arzig et al. |
| 3,535,870 A | 10/1970 | Mitchell |
| 3,565,283 A | 2/1971 | Sciacero et al. |
| 3,637,277 A | 1/1972 | Krug et al. |
| 3,666,067 A | 5/1972 | Kaiser |
| 3,694,590 A | 9/1972 | Otterlei |
| 3,721,463 A | 3/1973 | Attwood et al. |
| 3,770,090 A | 11/1973 | Fayling et al. |
| D230,511 S | 2/1974 | Stieber |
| 3,858,165 A | 12/1974 | Pegg |
| D234,606 S | 3/1975 | Gamble |
| 3,873,964 A | 3/1975 | Potter |
| 3,875,555 A | 4/1975 | Potter |
| D235,801 S | 7/1975 | Gore |
| 3,941,989 A | 3/1976 | McLaughlin et al. |
| 3,943,339 A | 3/1976 | Koerner et al. |
| 3,964,590 A | 6/1976 | May et al. |
| 3,975,934 A | 8/1976 | Babai et al. |
| 3,982,620 A | 9/1976 | Kortenhaus |
| 3,991,595 A | 11/1976 | Bahry et al. |
| 3,999,372 A | 12/1976 | Welch et al. |
| 4,007,564 A | 2/1977 | Chisholm |
| 4,031,991 A | 6/1977 | Malott |
| 4,037,700 A | 7/1977 | Heraty |
| 4,043,117 A | 8/1977 | Maresca et al. |
| RE29,577 E | 3/1978 | Hederich et al. |
| 4,147,707 A | 4/1979 | Alewelt et al. |
| 4,237,710 A | 12/1980 | Cardozo |
| 4,248,336 A | 2/1981 | Fiedler |
| 4,249,648 A | 2/1981 | Meyer |
| 4,264,963 A | 4/1981 | Leach |
| 4,306,219 A | 12/1981 | Main et al. |
| 4,310,890 A | 1/1982 | Trehn et al. |
| 4,317,180 A | 2/1982 | Lies |
| 4,317,181 A | 2/1982 | Teza et al. |
| 4,323,847 A | 4/1982 | Karbowski |
| 4,358,749 A | 11/1982 | Clark |
| 4,379,334 A | 4/1983 | Feagins, Jr. et al. |
| 4,409,665 A | 10/1983 | Tubbs |
| D272,291 S | 1/1984 | Hauser et al. |
| 4,432,447 A | 2/1984 | Tanaka |
| 4,460,080 A | 7/1984 | Howard |
| 4,460,965 A | 7/1984 | Trehn et al. |
| 4,472,706 A | 9/1984 | Hodge et al. |
| 4,474,281 A | 10/1984 | Roberts et al. |
| 4,479,191 A | 10/1984 | Nojima et al. |
| 4,483,431 A | 11/1984 | Pratt |
| 4,491,841 A | 1/1985 | Clark |
| D278,689 S | 5/1985 | Jupe |
| 4,574,936 A | 3/1986 | Klinger |
| 4,639,021 A | 1/1987 | Hope |
| D288,441 S | 2/1987 | Lalonde |
| D289,914 S | 5/1987 | Willinger et al. |
| 4,678,994 A | 7/1987 | Davies |
| 4,680,717 A | 7/1987 | Martin |
| 4,742,903 A | 5/1988 | Trummer |
| 4,749,074 A | 6/1988 | Ueki et al. |
| 4,754,126 A | 6/1988 | Caldwell |
| D296,795 S | 7/1988 | Bouve |
| 4,763,769 A | 8/1988 | Levasseur |
| 4,798,273 A | 1/1989 | Ward, II |
| 4,809,838 A | 3/1989 | Houserman |
| 4,812,805 A | 3/1989 | Lachat et al. |
| 4,823,928 A | 4/1989 | Speas |

(56) References Cited

U.S. PATENT DOCUMENTS

| | | |
|---|---|---|
| 4,825,425 A | 4/1989 | Turner |
| 4,827,206 A | 5/1989 | Speas |
| 4,845,484 A | 7/1989 | Ellsberg |
| 4,848,556 A | 7/1989 | Shah et al. |
| 4,851,987 A | 7/1989 | Day |
| 4,872,149 A | 10/1989 | Speas |
| 4,875,598 A | 10/1989 | Dahl |
| 4,880,097 A | 11/1989 | Speas |
| 4,880,406 A | 11/1989 | Van Horn et al. |
| 4,895,238 A | 1/1990 | Speas |
| D307,875 S | 5/1990 | Mallory |
| 4,951,799 A | 8/1990 | Kai |
| 4,967,895 A | 11/1990 | Speas |
| 4,967,985 A | 11/1990 | Deakin |
| 4,976,630 A | 12/1990 | Schuder et al. |
| 4,989,714 A | 2/1991 | Abe |
| 5,027,390 A | 6/1991 | Hughes |
| 5,027,935 A | 7/1991 | Berg et al. |
| 5,029,094 A | 7/1991 | Wong |
| D319,077 S | 8/1991 | Arato et al. |
| 5,060,777 A | 10/1991 | Van Horn et al. |
| 5,065,156 A | 11/1991 | Bernier |
| 5,076,414 A | 12/1991 | Kimoto |
| 5,088,073 A | 2/1992 | Speas |
| 5,109,972 A | 5/1992 | Van Horn et al. |
| 5,119,916 A | 6/1992 | Carmen et al. |
| 5,142,277 A | 8/1992 | Yarberry et al. |
| 5,153,525 A | 10/1992 | Hoekman et al. |
| 5,155,614 A | 10/1992 | Carmen et al. |
| 5,158,166 A | 10/1992 | Barson |
| 5,184,707 A | 2/1993 | Van Horn et al. |
| 5,192,855 A | 3/1993 | Insulander et al. |
| 5,201,396 A | 4/1993 | Chalabian et al. |
| D335,460 S | 5/1993 | Tanaka |
| D336,860 S | 6/1993 | Clough |
| 5,222,076 A | 6/1993 | Ng et al. |
| D337,953 S | 8/1993 | Verborn et al. |
| 5,244,070 A | 9/1993 | Carmen et al. |
| D340,038 S | 10/1993 | Venne et al. |
| 5,259,491 A | 11/1993 | Ward, II |
| 5,266,947 A | 11/1993 | Fujiwara et al. |
| D342,209 S | 12/1993 | Clough |
| 5,273,151 A | 12/1993 | Carmen et al. |
| 5,287,384 A | 2/1994 | Avery et al. |
| 5,293,979 A | 3/1994 | Levasseur |
| 5,298,894 A | 3/1994 | Cerny et al. |
| 5,339,594 A | 8/1994 | Ventura-Berti |
| 5,343,237 A | 8/1994 | Morimoto |
| D351,193 S | 10/1994 | Abe |
| 5,351,798 A | 10/1994 | Hayes |
| 5,360,095 A | 11/1994 | Speas |
| D354,047 S | 1/1995 | Leggate et al. |
| D354,835 S | 1/1995 | Brendel |
| 5,382,780 A | 1/1995 | Carmen et al. |
| 5,402,475 A | 3/1995 | Lesner, Jr. et al. |
| 5,407,049 A | 4/1995 | Yost |
| 5,426,363 A | 6/1995 | Akagi et al. |
| D360,734 S | 7/1995 | Hall |
| D360,737 S | 7/1995 | Helbig, Jr. |
| 5,439,089 A | 8/1995 | Parker |
| 5,442,348 A | 8/1995 | Mushell |
| 5,454,461 A | 10/1995 | Yost |
| D364,165 S | 11/1995 | Esslinger |
| 5,471,139 A | 11/1995 | Zadoff |
| 5,475,373 A | 12/1995 | Speas |
| 5,489,014 A | 2/1996 | Menoud |
| 5,500,517 A | 3/1996 | Cagliostro |
| 5,507,378 A | 4/1996 | Leone |
| 5,526,662 A | 6/1996 | Diekhoff et al. |
| 5,563,491 A | 10/1996 | Tseng |
| 5,568,441 A | 10/1996 | Sanemitsu |
| D375,607 S | 11/1996 | Hall |
| 5,570,771 A | 11/1996 | Yost |
| 5,573,099 A | 11/1996 | Church et al. |
| 5,614,892 A | 3/1997 | Ward, II et al. |
| 5,617,942 A | 4/1997 | Ward, II et al. |
| 5,619,932 A | 4/1997 | Efland et al. |
| 5,640,002 A | 6/1997 | Ruppert et al. |
| 5,642,119 A | 6/1997 | Jacobs |
| 5,648,906 A | 7/1997 | Amirpanahi |
| D381,796 S | 8/1997 | Kittle et al. |
| 5,659,306 A | 8/1997 | Bahar |
| 5,687,129 A | 11/1997 | Kim |
| D388,227 S | 12/1997 | Dallman et al. |
| D388,231 S | 12/1997 | Magee et al. |
| 5,710,743 A | 1/1998 | Dee et al. |
| D391,238 S | 2/1998 | Sakata |
| 5,732,812 A | 3/1998 | Grainger et al. |
| D393,212 S | 4/1998 | Lucas et al. |
| 5,737,710 A | 4/1998 | Anthonyson |
| 5,740,050 A | 4/1998 | Ward, II |
| 5,748,103 A | 5/1998 | Flach et al. |
| D395,133 S | 6/1998 | Mikami et al. |
| 5,761,061 A | 6/1998 | Amano |
| 5,777,302 A | 7/1998 | Nakagawa et al. |
| 5,777,951 A | 7/1998 | Mitschele et al. |
| 5,777,957 A | 7/1998 | Lyman |
| 5,778,067 A | 7/1998 | Jones et al. |
| D396,655 S | 8/1998 | Anderson |
| 5,792,298 A | 8/1998 | Sauer et al. |
| 5,803,228 A | 8/1998 | Lucas |
| 5,805,083 A | 9/1998 | Sutton et al. |
| 5,806,651 A | 9/1998 | Carmen et al. |
| D400,115 S | 10/1998 | Yaron |
| D400,684 S | 11/1998 | Dallman |
| 5,833,042 A | 11/1998 | Baitch et al. |
| 5,841,369 A | 11/1998 | Sutton et al. |
| 5,842,411 A | 12/1998 | Johnson |
| 5,845,268 A | 12/1998 | Moore |
| 5,852,411 A | 12/1998 | Jacobs et al. |
| D404,025 S | 1/1999 | Van Horne et al. |
| 5,903,520 A | 5/1999 | Dee et al. |
| 5,906,260 A | 5/1999 | Goodrich |
| 5,911,763 A | 6/1999 | Quesada |
| 5,915,246 A | 6/1999 | Patterson et al. |
| D411,848 S | 7/1999 | Maruska et al. |
| D412,233 S | 7/1999 | Cajacob et al. |
| D412,289 S | 7/1999 | Winwood |
| D413,311 S | 8/1999 | Blalock |
| 5,936,527 A | 8/1999 | Isaacman et al. |
| 5,936,551 A | 8/1999 | Allen et al. |
| 5,940,481 A | 8/1999 | Zeitman |
| 5,954,182 A | 9/1999 | Wei |
| 5,966,345 A | 10/1999 | Dee et al. |
| D419,277 S | 1/2000 | Ishii et al. |
| 6,018,327 A | 1/2000 | Nakano et al. |
| 6,026,946 A | 2/2000 | McCarty, Jr. |
| 6,029,888 A | 2/2000 | Harvey |
| D421,399 S | 3/2000 | Bennett et al. |
| 6,037,880 A | 3/2000 | Manion |
| D423,181 S | 4/2000 | Dallman |
| D423,755 S | 4/2000 | Ha |
| 6,052,453 A | 4/2000 | Sagady et al. |
| D427,413 S | 6/2000 | Wallace et al. |
| 6,078,272 A | 6/2000 | Jacobs et al. |
| 6,081,205 A | 6/2000 | Williams |
| 6,081,206 A | 6/2000 | Kielland |
| 6,082,153 A | 7/2000 | Schoell et al. |
| 6,098,361 A | 8/2000 | Roten et al. |
| 6,107,942 A | 8/2000 | Yoo et al. |
| 6,109,418 A | 8/2000 | Yost |
| 6,111,522 A | 8/2000 | Hiltz et al. |
| D430,810 S | 9/2000 | Omuro et al. |
| 6,116,403 A | 9/2000 | Kiehl |
| D431,788 S | 10/2000 | Tuxen et al. |
| D432,286 S | 10/2000 | Irie |
| 6,132,152 A | 10/2000 | Kaibach et al. |
| 6,147,624 A | 11/2000 | Clapper |
| D437,468 S | 2/2001 | Fukutake et al. |
| 6,188,328 B1 | 2/2001 | Ho |
| 6,193,045 B1 | 2/2001 | Ishida et al. |
| 6,195,015 B1 | 2/2001 | Jacobs et al. |
| D439,591 S | 3/2001 | Reidt et al. |
| RE37,193 E | 5/2001 | Ward, II |

(56) References Cited

U.S. PATENT DOCUMENTS

| | | |
|---|---|---|
| 6,227,343 B1 | 5/2001 | Neathway et al. |
| 6,229,455 B1 | 5/2001 | Yost et al. |
| 6,230,868 B1 | 5/2001 | Tuxen et al. |
| 6,236,718 B1 | 5/2001 | Goodman |
| 6,243,028 B1 | 6/2001 | Krygler et al. |
| 6,243,029 B1 | 6/2001 | Tomer |
| 6,275,169 B1 | 8/2001 | Krygler et al. |
| 6,275,170 B1 | 8/2001 | Jacobs et al. |
| D447,714 S | 9/2001 | Cappiello |
| D448,910 S | 10/2001 | Kit et al. |
| D449,010 S | 10/2001 | Petrucelli |
| 6,307,152 B1 | 10/2001 | Bonilla et al. |
| 6,309,098 B1 | 10/2001 | Wong |
| D450,253 S | 11/2001 | Marguet |
| 6,312,152 B2 | 11/2001 | Dee et al. |
| 6,321,201 B1 | 11/2001 | Dahl |
| RE37,531 E | 1/2002 | Chaco et al. |
| 6,340,935 B1 | 1/2002 | Hall |
| 6,344,806 B1 | 2/2002 | Katz |
| D454,421 S | 3/2002 | Jeon et al. |
| D454,807 S | 3/2002 | Cappiello |
| 6,354,425 B1 | 3/2002 | Tuxen et al. |
| D456,587 S | 4/2002 | Kit et al. |
| 6,366,220 B1 | 4/2002 | Elliott |
| 6,373,401 B2 | 4/2002 | Ho |
| 6,373,422 B1 | 4/2002 | Mostafa |
| 6,373,442 B1 | 4/2002 | Thomas et al. |
| 6,380,851 B1 | 4/2002 | Gilbert et al. |
| D460,005 S | 7/2002 | Jacquet |
| D461,728 S | 8/2002 | Tuxen et al. |
| 6,456,491 B1 | 9/2002 | Flannery et al. |
| D463,749 S | 10/2002 | Petrucelli |
| 6,467,602 B2 | 10/2002 | Bench et al. |
| 6,477,505 B2 | 11/2002 | Ward, II et al. |
| 6,477,875 B2 | 11/2002 | Field et al. |
| D467,954 S | 12/2002 | Suzuki et al. |
| 6,493,676 B1 | 12/2002 | Levy |
| 6,505,774 B1 | 1/2003 | Fulcher et al. |
| D471,238 S | 3/2003 | Showers et al. |
| D472,362 S | 3/2003 | Zerman et al. |
| 6,527,172 B1 | 3/2003 | Lewis et al. |
| 6,539,370 B1 | 3/2003 | Chang et al. |
| 6,547,586 B2 | 4/2003 | Yasuda et al. |
| 6,559,776 B2 | 5/2003 | Katz |
| 6,575,281 B2 | 6/2003 | Lee |
| D477,030 S | 7/2003 | Kolls et al. |
| D481,516 S | 10/2003 | Magee et al. |
| D485,417 S | 1/2004 | Magee et al. |
| 6,697,730 B2 | 2/2004 | Dickerson |
| D488,280 S | 4/2004 | Zerman et al. |
| 6,731,942 B1 | 5/2004 | Nageli |
| D490,727 S | 6/2004 | Kido et al. |
| D492,080 S | 6/2004 | Magee et al. |
| D492,081 S | 6/2004 | Magee et al. |
| D492,085 S | 6/2004 | Korte et al. |
| 6,747,575 B2 | 6/2004 | Chauvin et al. |
| 6,763,094 B2 | 7/2004 | Conn et al. |
| D494,730 S | 8/2004 | Magee et al. |
| 6,791,473 B2 | 9/2004 | Kibria et al. |
| RE38,626 E | 10/2004 | Kielland |
| D497,393 S | 10/2004 | Herbst |
| 6,799,387 B2 | 10/2004 | Pippins |
| D497,814 S | 11/2004 | Odinotski et al. |
| D498,795 S | 11/2004 | Nunn |
| 6,812,857 B1 | 11/2004 | Kassab et al. |
| 6,823,317 B1 | 11/2004 | Ouimet et al. |
| 6,856,922 B1 | 2/2005 | Austin et al. |
| 6,874,340 B1 | 4/2005 | Berman |
| 6,885,311 B2 | 4/2005 | Howard et al. |
| D505,240 S | 5/2005 | Swaine et al. |
| D505,765 S | 5/2005 | Swaine et al. |
| 6,889,899 B2 | 5/2005 | Silberberg |
| D506,509 S | 6/2005 | Nunn |
| D506,769 S | 6/2005 | Asai |
| 6,914,411 B2 | 7/2005 | Couch et al. |
| 6,919,179 B2 | 7/2005 | Rothschild et al. |
| D508,064 S | 8/2005 | Ramirez |
| 6,929,179 B2 | 8/2005 | Fulcher et al. |
| 6,946,974 B1 | 9/2005 | Racunas Jr. |
| D510,751 S | 10/2005 | Magee et al. |
| 7,004,385 B1 | 2/2006 | Douglass |
| 7,014,355 B2 | 3/2006 | Potter, Sr. et al. |
| 7,019,420 B2 | 3/2006 | Kogan et al. |
| 7,019,670 B2 | 3/2006 | Bahar |
| 7,023,360 B2 | 4/2006 | Staniszewski |
| 7,027,773 B1 | 4/2006 | McMillin |
| 7,027,808 B2 | 4/2006 | Wesby |
| 7,028,888 B2 | 4/2006 | Laskowski |
| 7,029,167 B1 | 4/2006 | Mitschele |
| D520,883 S | 5/2006 | Hillard et al. |
| 7,040,534 B2 | 5/2006 | Turocy et al. |
| 7,046,123 B1 | 5/2006 | Goldberg |
| D524,834 S | 7/2006 | Dozier et al. |
| 7,071,839 B2 | 7/2006 | Patel et al. |
| 7,104,447 B1 | 9/2006 | Lopez et al. |
| 7,110,762 B1 | 9/2006 | Cameron et al. |
| D530,880 S | 10/2006 | Magee et al. |
| 7,114,651 B2 | 10/2006 | Hjelmvik |
| 7,131,576 B2 | 11/2006 | Utz et al. |
| D535,268 S | 1/2007 | Holger |
| 7,181,426 B2 | 2/2007 | Dutta |
| 7,183,999 B2 | 2/2007 | Matthews et al. |
| D538,505 S | 3/2007 | Kang et al. |
| 7,188,070 B2 | 3/2007 | Dar et al. |
| D543,588 S | 5/2007 | Herbert et al. |
| 7,222,031 B2 | 5/2007 | Heatley et al. |
| 7,222,782 B2 | 5/2007 | Lute, Jr. et al. |
| 7,230,545 B2 | 6/2007 | Nath et al. |
| 7,237,176 B2 | 6/2007 | Briggs et al. |
| D546,365 S | 7/2007 | Jost et al. |
| 7,237,716 B2 | 7/2007 | Silberberg |
| 7,253,747 B2 | 8/2007 | Noguchi |
| 7,262,737 B2 | 8/2007 | Zarnowitz et al. |
| 7,284,692 B1 | 10/2007 | Douglass |
| D559,792 S | 1/2008 | Gemme et al. |
| 7,319,974 B1 | 1/2008 | Brusseaux |
| 7,321,317 B2 | 1/2008 | Nath et al. |
| 7,330,131 B2 | 2/2008 | Zanotti et al. |
| D570,920 S | 6/2008 | Choi |
| 7,382,238 B2 | 6/2008 | Kavaler |
| 7,382,281 B2 | 6/2008 | Kavaler |
| 7,382,282 B2 | 6/2008 | Kavaler |
| 7,385,484 B2 | 6/2008 | Nath et al. |
| 7,388,349 B2 | 6/2008 | Elder et al. |
| 7,388,517 B2 | 6/2008 | Kavaler |
| 7,391,339 B2 | 6/2008 | Howard et al. |
| 7,393,134 B2 | 7/2008 | Mitschele |
| D575,168 S | 8/2008 | King et al. |
| 7,419,091 B1 | 9/2008 | Scanlon |
| 7,427,931 B1 | 9/2008 | Kavaler et al. |
| D579,795 S | 11/2008 | Martinez et al. |
| 7,445,144 B2 | 11/2008 | Schlabach et al. |
| D582,125 S | 12/2008 | Kang et al. |
| D587,141 S | 2/2009 | King et al. |
| D588,916 S | 3/2009 | DeMarco |
| D591,181 S | 4/2009 | Kanbar |
| D592,825 S | 5/2009 | Kang et al. |
| 7,533,802 B1 | 5/2009 | McGinley et al. |
| 7,554,460 B2 | 6/2009 | Verkleeren et al. |
| D596,373 S | 7/2009 | Kang et al. |
| D596,374 S | 7/2009 | Kang et al. |
| 7,558,564 B2 | 7/2009 | Wesby |
| 7,575,166 B2 | 8/2009 | McNamara |
| 7,579,964 B2 | 8/2009 | Nath et al. |
| D600,152 S | 9/2009 | Stack et al. |
| 7,594,235 B2 | 9/2009 | Moreau |
| D602,225 S | 10/2009 | Lute et al. |
| D604,189 S | 11/2009 | Leer et al. |
| 7,611,045 B1 | 11/2009 | Lute et al. |
| 7,617,120 B2 | 11/2009 | Derasmo et al. |
| D605,145 S | 12/2009 | Kellar |
| 7,624,919 B2 | 12/2009 | Meek et al. |
| 7,632,419 B1 | 12/2009 | Grimbergen et al. |
| 7,671,803 B2 | 3/2010 | Neill et al. |

(56) References Cited

U.S. PATENT DOCUMENTS

| | | |
|---|---|---|
| 7,679,526 B2 | 3/2010 | Mardirossian |
| 7,699,224 B2 | 4/2010 | Mole |
| D615,274 S | 5/2010 | Kim et al. |
| 7,717,327 B2 | 5/2010 | Gomes |
| D617,799 S | 6/2010 | Odhe et al. |
| 7,726,558 B1 | 6/2010 | Lute et al. |
| 7,739,000 B2 | 6/2010 | Kevaler |
| D620,050 S | 7/2010 | Hultzman et al. |
| 7,748,620 B2 | 7/2010 | Gomez et al. |
| 7,772,720 B2 | 8/2010 | McGee et al. |
| 7,780,072 B1 | 8/2010 | Lute et al. |
| 7,783,530 B2 | 8/2010 | Slemmer et al. |
| D624,274 S | 9/2010 | Pendleton |
| D625,305 S | 10/2010 | Bleck et al. |
| 7,806,248 B2 | 10/2010 | Hunter et al. |
| D627,814 S | 11/2010 | Tzeng et al. |
| 7,825,826 B2 | 11/2010 | Welch |
| D629,585 S | 12/2010 | Bleck et al. |
| 7,854,310 B2 | 12/2010 | King et al. |
| 7,855,661 B2 | 12/2010 | Ponert |
| 7,874,482 B2 | 1/2011 | Mitschele |
| D632,740 S | 2/2011 | Adeline |
| 7,891,546 B1 | 2/2011 | Steinbach et al. |
| D634,417 S | 3/2011 | Abbondanzio et al. |
| 7,899,583 B2 | 3/2011 | Mendelson |
| 7,908,149 B2 | 3/2011 | Dar et al. |
| 7,933,841 B2 | 4/2011 | Schmeyer et al. |
| D645,223 S | 9/2011 | Bleck et al. |
| 8,035,533 B2 | 10/2011 | Kavaler |
| 8,044,139 B2 | 10/2011 | Youn et al. |
| D651,784 S | 1/2012 | Rohan et al. |
| D652,329 S | 1/2012 | MacKay et al. |
| D652,601 S | 1/2012 | Rohan et al. |
| D652,602 S | 1/2012 | Rohan et al. |
| D652,872 S | 1/2012 | Mougin et al. |
| D653,012 S | 1/2012 | Rohan et al. |
| D653,014 S | 1/2012 | Rohan et al. |
| D653,420 S | 1/2012 | Rohan et al. |
| D653,421 S | 1/2012 | Rohan et al. |
| D653,422 S | 1/2012 | Rohan et al. |
| D653,423 S | 1/2012 | Rohan et al. |
| D653,424 S | 1/2012 | Rohan et al. |
| D654,816 S | 2/2012 | MacKay et al. |
| RE43,245 E | 3/2012 | Ouimet et al. |
| D655,263 S | 3/2012 | Tsai |
| D656,046 S | 3/2012 | MacKay et al. |
| 8,138,950 B1 | 3/2012 | Leung |
| 8,144,034 B2 | 3/2012 | Kavaler |
| D659,557 S | 5/2012 | Jones et al. |
| 8,181,857 B1 | 5/2012 | Lute et al. |
| 8,184,019 B2 | 5/2012 | Chauvin et al. |
| D661,603 S | 6/2012 | MacKay et al. |
| D661,608 S | 6/2012 | Kimmich |
| 8,193,540 B2 | 6/2012 | Huang et al. |
| 8,232,894 B2 | 7/2012 | Weiss et al. |
| 8,250,887 B2 | 8/2012 | MacKay et al. |
| 8,264,401 B1 | 9/2012 | Kavaler |
| 8,279,107 B2 | 10/2012 | Krstanovic et al. |
| D672,525 S | 12/2012 | Lee et al. |
| 8,325,057 B2 | 12/2012 | Salter |
| D674,985 S | 1/2013 | Lee |
| D677,035 S | 2/2013 | Lee et al. |
| D677,714 S | 3/2013 | Helgesson et al. |
| 8,395,532 B2 | 3/2013 | Chauvin et al. |
| 8,402,281 B2 | 3/2013 | Dahl |
| D680,156 S | 4/2013 | Hernandez et al. |
| 8,417,715 B1 | 4/2013 | Bruckhaus et al. |
| D681,717 S | 5/2013 | Helgesson et al. |
| D682,504 S | 5/2013 | Lee et al. |
| 8,450,627 B2 | 5/2013 | Mittleman et al. |
| D683,779 S | 6/2013 | Uemachi et al. |
| D683,794 S | 6/2013 | Randall |
| D683,795 S | 6/2013 | Randall |
| D684,745 S | 6/2013 | Reuter et al. |
| D684,870 S | 6/2013 | Jones et al. |
| 8,479,909 B2 | 7/2013 | King et al. |
| 8,487,754 B2 | 7/2013 | Mitschele |
| D687,809 S | 8/2013 | Bergmann et al. |
| 8,513,832 B2 | 8/2013 | Hunter et al. |
| D689,554 S | 9/2013 | Echanove Hernandez |
| D690,771 S | 10/2013 | Randall |
| D691,165 S | 10/2013 | Attoma |
| 8,566,159 B2 | 10/2013 | King et al. |
| D692,784 S | 11/2013 | Anderssen et al. |
| D693,983 S | 11/2013 | Budde et al. |
| 8,573,484 B1 | 11/2013 | Irudayam et al. |
| 8,589,216 B2 | 11/2013 | Yu et al. |
| 8,590,687 B2 | 11/2013 | King et al. |
| 8,595,054 B2 | 11/2013 | King et al. |
| D696,484 S | 12/2013 | Lee et al. |
| D696,485 S | 12/2013 | Lee et al. |
| 8,621,245 B2 | 12/2013 | Shearer et al. |
| 8,631,921 B2 | 1/2014 | Jones et al. |
| 8,662,279 B2 | 3/2014 | Jones et al. |
| 8,666,801 B2 | 3/2014 | Cho |
| D702,913 S | 4/2014 | Budde et al. |
| D702,914 S | 4/2014 | Budde et al. |
| 8,684,158 B2 | 4/2014 | Jones et al. |
| 8,710,798 B2 | 4/2014 | Turner |
| D705,090 S | 5/2014 | MacKay et al. |
| 8,727,207 B1 | 5/2014 | Church et al. |
| D707,140 S | 6/2014 | King et al. |
| D707,141 S | 6/2014 | King et al. |
| D707,142 S | 6/2014 | King et al. |
| D707,574 S | 6/2014 | Ku et al. |
| 8,749,403 B2 | 6/2014 | King et al. |
| 8,770,371 B2 | 7/2014 | MacKay et al. |
| 8,770,372 B2 | 7/2014 | Dobbins et al. |
| 8,807,317 B2 | 8/2014 | MacKay et al. |
| D714,165 S | 9/2014 | Salama et al. |
| D715,661 S | 10/2014 | McKaughan et al. |
| D716,156 S | 10/2014 | Jones et al. |
| D716,157 S | 10/2014 | MacKay et al. |
| D716,515 S | 10/2014 | Cha et al. |
| 8,862,494 B2 | 10/2014 | King et al. |
| D716,671 S | 11/2014 | Jones et al. |
| 8,884,785 B2 | 11/2014 | Groft et al. |
| 8,936,505 B2 | 1/2015 | Bengtsson |
| D722,740 S | 2/2015 | Budde et al. |
| D724,290 S | 3/2015 | Cha et al. |
| D724,811 S | 3/2015 | Reitinger |
| D724,812 S | 3/2015 | Cha et al. |
| D725,504 S | 3/2015 | McEneany et al. |
| D728,190 S | 4/2015 | Sheley |
| 9,002,723 B2 | 4/2015 | King et al. |
| D732,263 S | 6/2015 | Budde et al. |
| 9,047,712 B2 | 6/2015 | King et al. |
| D733,585 S | 7/2015 | Jones et al. |
| D735,437 S | 7/2015 | Randall |
| D735,438 S | 7/2015 | Randall |
| D735,439 S | 7/2015 | Randall |
| D735,440 S | 7/2015 | Randall |
| D735,963 S | 8/2015 | Randall |
| D735,964 S | 8/2015 | Randall |
| D735,965 S | 8/2015 | Randall |
| D739,637 S | 9/2015 | Randall |
| D739,638 S | 9/2015 | Randall |
| D739,639 S | 9/2015 | Randall |
| 9,123,184 B2 | 9/2015 | Jones et al. |
| 9,127,964 B2 | 9/2015 | Schwarz et al. |
| 9,147,345 B2 | 9/2015 | Agrait et al. |
| D741,040 S | 10/2015 | Budde et al. |
| D742,090 S | 10/2015 | Randall |
| 9,159,080 B2 | 10/2015 | Fiorucci et al. |
| 9,169,626 B2 | 10/2015 | Guler et al. |
| D742,371 S | 11/2015 | Bopp et al. |
| D743,956 S | 11/2015 | Kraft et al. |
| 9,196,097 B2 | 11/2015 | Jones et al. |
| D746,015 S | 12/2015 | King et al. |
| D746,704 S | 1/2016 | Jones et al. |
| D748,364 S | 1/2016 | King et al. |
| D748,888 S | 2/2016 | King et al. |
| D749,000 S | 2/2016 | King et al. |
| D749,290 S | 2/2016 | Pollmann |

(56) References Cited

U.S. PATENT DOCUMENTS

| | | |
|---|---|---|
| 9,262,915 B2 | 2/2016 | Clem et al. |
| 9,269,216 B2 | 2/2016 | Keilwert |
| D750,513 S | 3/2016 | King et al. |
| D750,978 S | 3/2016 | van Slooten et al. |
| D752,552 S | 3/2016 | D'Ascanio et al. |
| D755,649 S | 5/2016 | King et al. |
| D755,650 S | 5/2016 | King et al. |
| D756,807 S | 5/2016 | King et al. |
| D756,808 S | 5/2016 | King et al. |
| D762,040 S | 7/2016 | King et al. |
| 9,384,554 B2 | 7/2016 | Xu et al. |
| 9,391,474 B2 | 7/2016 | Hunter et al. |
| 9,424,691 B2 | 8/2016 | King et al. |
| 9,443,236 B2 | 9/2016 | MacKay et al. |
| D769,570 S | 10/2016 | Kraft et al. |
| D769,571 S | 10/2016 | Lee et al. |
| D769,572 S | 10/2016 | Park et al. |
| 9,489,776 B2 | 11/2016 | Keller et al. |
| 9,494,922 B2 | 11/2016 | MacKay et al. |
| 9,508,198 B1 | 11/2016 | King et al. |
| 9,524,498 B2 | 12/2016 | Jones et al. |
| 9,536,235 B2 | 1/2017 | Jones et al. |
| 9,536,370 B2 | 1/2017 | Jones et al. |
| D779,771 S | 2/2017 | King et al. |
| D779,772 S | 2/2017 | King et al. |
| D779,773 S | 2/2017 | King et al. |
| D779,774 S | 2/2017 | King et al. |
| 9,580,198 B2 | 2/2017 | Ehrmann et al. |
| D781,024 S | 3/2017 | King et al. |
| D782,349 S | 3/2017 | Konotopskyi et al. |
| 9,652,921 B2 | 5/2017 | MacKay et al. |
| 9,661,403 B2 | 5/2017 | King et al. |
| 9,685,027 B2 | 6/2017 | King et al. |
| 9,692,256 B2 | 6/2017 | Hunter et al. |
| D791,621 S | 7/2017 | Loye et al. |
| D792,049 S | 7/2017 | Oh et al. |
| 9,697,506 B2 | 7/2017 | Jones et al. |
| 9,707,911 B1 | 7/2017 | Myers et al. |
| D795,523 S | 8/2017 | King et al. |
| 9,728,085 B2 | 8/2017 | Schwarz et al. |
| 9,749,823 B2 | 8/2017 | Rowe et al. |
| D796,355 S | 9/2017 | Cho et al. |
| 9,773,351 B2 | 9/2017 | Hudson et al. |
| D799,992 S | 10/2017 | Ehara |
| D801,304 S | 10/2017 | Kiafoulis et al. |
| D801,405 S | 10/2017 | Shih et al. |
| 9,779,565 B2 | 10/2017 | Rabbat |
| 9,805,518 B2 | 10/2017 | King et al. |
| D802,874 S | 11/2017 | King et al. |
| D802,875 S | 11/2017 | King et al. |
| D802,876 S | 11/2017 | King et al. |
| D802,877 S | 11/2017 | King et al. |
| D802,878 S | 11/2017 | King et al. |
| 9,842,346 B2 | 12/2017 | Fiorucci et al. |
| D813,059 S | 3/2018 | MacKay et al. |
| D813,838 S | 3/2018 | Pietschmann et al. |
| D832,553 S | 10/2018 | Angelopoulos et al. |
| 10,089,814 B2 | 10/2018 | King et al. |
| D832,809 S | 11/2018 | Hardi |
| 10,141,629 B2 | 11/2018 | MacKay et al. |
| D834,971 S | 12/2018 | Ahn et al. |
| 10,154,029 B1 | 12/2018 | Griffin |
| D843,973 S | 3/2019 | Klosowski et al. |
| 10,262,345 B2 | 4/2019 | King et al. |
| 10,297,150 B2 | 5/2019 | Schwarz et al. |
| 10,299,018 B1 | 5/2019 | King et al. |
| D851,605 S | 6/2019 | Maetani et al. |
| D852,454 S | 6/2019 | King et al. |
| 10,315,665 B2 | 6/2019 | Halder |
| D853,079 S | 7/2019 | King et al. |
| D853,678 S | 7/2019 | King et al. |
| D853,679 S | 7/2019 | King et al. |
| D854,430 S | 7/2019 | Elrod et al. |
| 10,366,546 B2 | 7/2019 | King et al. |
| D858,381 S | 9/2019 | Ahn et al. |
| 10,423,980 B2 | 9/2019 | King et al. |
| D863,074 S | 10/2019 | MacKay et al. |
| D863,075 S | 10/2019 | MacKay et al. |
| D863,076 S | 10/2019 | MacKay et al. |
| D863,987 S | 10/2019 | MacKay et al. |
| D863,988 S | 10/2019 | MacKay et al. |
| D865,315 S | 10/2019 | King et al. |
| 10,464,530 B2 | 11/2019 | Falkson et al. |
| 10,491,972 B2 | 11/2019 | King et al. |
| 10,503,990 B2 | 12/2019 | Gleeson-May et al. |
| D872,600 S | 1/2020 | King et al. |
| 10,573,953 B2 | 2/2020 | MacKay et al. |
| 10,574,085 B2 | 2/2020 | Hunter et al. |
| D879,404 S | 3/2020 | Morishito et al. |
| D882,426 S | 4/2020 | Gross et al. |
| D883,605 S | 5/2020 | Lee et al. |
| 10,664,880 B2 | 5/2020 | King et al. |
| D886,649 S | 6/2020 | Lan et al. |
| 10,674,236 B2 | 6/2020 | King et al. |
| D901,825 S | 11/2020 | Nelson et al. |
| 10,861,334 B2 | 12/2020 | Torres |
| RE48,566 E | 5/2021 | Mackay et al. |
| D927,998 S | 8/2021 | Ahn et al. |
| D928,639 S | 8/2021 | Ahn et al. |
| D930,493 S | 9/2021 | Katzenelson |
| 11,172,274 B2 | 11/2021 | King et al. |
| D938,668 S | 12/2021 | Jia |
| D954,571 S | 6/2022 | Ahn et al. |
| D955,230 S | 6/2022 | King et al. |
| D955,231 S | 6/2022 | King et al. |
| 11,386,420 B2 | 7/2022 | Nolan et al. |
| D959,298 S | 8/2022 | Jones et al. |
| D959,299 S | 8/2022 | Jones et al. |
| D959,997 S | 8/2022 | Jones et al. |
| D960,400 S | 8/2022 | Ding |
| D962,239 S | 8/2022 | Arenas de Jesus et al. |
| 11,423,776 B2 | 8/2022 | Schwarz et al. |
| 11,430,027 B2 | 8/2022 | King et al. |
| 11,436,649 B2 | 9/2022 | King et al. |
| 11,462,109 B2 | 10/2022 | King et al. |
| 11,475,491 B2 | 10/2022 | King et al. |
| D971,033 S | 11/2022 | King et al. |
| D971,034 S | 11/2022 | King et al. |
| D971,035 S | 11/2022 | King et al. |
| D986,082 S | 5/2023 | Jones et al. |
| D986,084 S | 5/2023 | Jones et al. |
| D987,444 S | 5/2023 | King et al. |
| 11,683,617 B2 | 6/2023 | King et al. |
| 11,688,277 B2 | 6/2023 | Schwarz et al. |
| 2001/0012241 A1 | 8/2001 | Dee et al. |
| 2001/0027626 A1 | 10/2001 | Natelli, Jr. |
| 2001/0037928 A1 | 11/2001 | Bench et al. |
| 2001/0047278 A1 | 11/2001 | Brookner et al. |
| 2001/0051531 A1 | 12/2001 | Singhal et al. |
| 2002/0008639 A1 | 1/2002 | Dee |
| 2002/0030606 A1 | 3/2002 | Chauvin et al. |
| 2002/0062172 A1 | 5/2002 | Bench |
| 2002/0063035 A1 | 5/2002 | Blad et al. |
| 2002/0074344 A1 | 6/2002 | Long et al. |
| 2002/0080013 A1 | 6/2002 | Anderson, III et al. |
| 2002/0100810 A1 | 8/2002 | Amadeo |
| 2002/0111768 A1 | 8/2002 | Ghorayeb et al. |
| 2002/0134645 A1 | 9/2002 | Alexander et al. |
| 2003/0010821 A1 | 1/2003 | Silberberg |
| 2003/0017904 A1 | 1/2003 | Lee |
| 2003/0092387 A1 | 5/2003 | Hjelmvik |
| 2003/0112151 A1 | 6/2003 | Chauvin et al. |
| 2003/0112597 A1 | 6/2003 | Smith |
| 2003/0117904 A1 | 6/2003 | Lank et al. |
| 2003/0121754 A1 | 7/2003 | King |
| 2003/0128010 A1 | 7/2003 | Hsu |
| 2003/0128136 A1 | 7/2003 | Spier et al. |
| 2003/0132292 A1 | 7/2003 | Gomez et al. |
| 2003/0132840 A1 | 7/2003 | Bahar |
| 2003/0135407 A1 | 7/2003 | Reinhardt et al. |
| 2003/0140531 A1 | 7/2003 | Pippins |
| 2003/0144905 A1 | 7/2003 | Smith |
| 2003/0144972 A1 | 7/2003 | Cordery et al. |
| 2003/0169183 A1 | 9/2003 | Korepanov et al. |

(56) References Cited

U.S. PATENT DOCUMENTS

| | | |
|---|---|---|
| 2003/0179107 A1 | 9/2003 | Kibria et al. |
| 2003/0220835 A1 | 11/2003 | Barnes, Jr. |
| 2003/0222792 A1 | 12/2003 | Berman et al. |
| 2003/0229793 A1 | 12/2003 | McCall et al. |
| 2003/0234888 A1 | 12/2003 | Hong et al. |
| 2004/0011099 A1 | 1/2004 | Andersson |
| 2004/0016796 A1 | 1/2004 | Hanna et al. |
| 2004/0039632 A1 | 2/2004 | Han et al. |
| 2004/0040028 A1 | 2/2004 | Moreau |
| 2004/0068434 A1 | 4/2004 | Kanekon |
| 2004/0084278 A1 | 5/2004 | Harris et al. |
| 2004/0094619 A1 | 5/2004 | Silberberg |
| 2004/0160905 A1 | 8/2004 | Bernier et al. |
| 2004/0160906 A1 | 8/2004 | Greszczuk et al. |
| 2004/0181496 A1 | 9/2004 | Odinotski et al. |
| 2004/0232878 A1 | 11/2004 | Couch et al. |
| 2004/0243526 A1 | 12/2004 | Krygler et al. |
| 2004/0254840 A1 | 12/2004 | Slemmer et al. |
| 2004/0254900 A1 | 12/2004 | Reinhard |
| 2004/0262379 A1 | 12/2004 | Gomes |
| 2004/0263117 A1 | 12/2004 | Kogan |
| 2004/0264302 A1 | 12/2004 | Ward, II |
| 2005/0001779 A1 | 1/2005 | Copeland et al. |
| 2005/0029340 A1 | 2/2005 | Ferraro |
| 2005/0035740 A1 | 2/2005 | Elder et al. |
| 2005/0040951 A1 | 2/2005 | Zalewski et al. |
| 2005/0068201 A1 | 3/2005 | Wulff et al. |
| 2005/0099320 A1 | 5/2005 | Nath et al. |
| 2005/0102075 A1 | 5/2005 | Dar et al. |
| 2005/0155839 A1 | 7/2005 | Banks et al. |
| 2005/0168352 A1 | 8/2005 | Tomer |
| 2005/0178639 A1 | 8/2005 | Brumfield et al. |
| 2005/0192911 A1 | 9/2005 | Mattern |
| 2005/0216354 A1 | 9/2005 | Vayusa |
| 2005/0226201 A1 | 10/2005 | McMillin |
| 2006/0020487 A1 | 1/2006 | Spittel et al. |
| 2006/0021848 A1 | 2/2006 | Smith |
| 2006/0052055 A1 | 3/2006 | Rowse et al. |
| 2006/0114159 A1 | 6/2006 | Yoshikawa et al. |
| 2006/0116972 A1 | 6/2006 | Wong |
| 2006/0136131 A1 | 6/2006 | Dugan et al. |
| 2006/0149684 A1 | 7/2006 | Matsuura et al. |
| 2006/0152349 A1 | 7/2006 | Ratnakar |
| 2006/0152385 A1 | 7/2006 | Mandy |
| 2006/0173733 A1 | 8/2006 | Fancher |
| 2006/0255119 A1 | 11/2006 | Marchasin et al. |
| 2006/0259354 A1 | 11/2006 | Yan |
| 2006/0267799 A1 | 11/2006 | Mendelson |
| 2007/0011700 A1 | 1/2007 | Johnson |
| 2007/0016539 A1 | 1/2007 | Groft et al. |
| 2007/0017265 A1 | 1/2007 | Andersson |
| 2007/0029825 A1 | 2/2007 | Franklin et al. |
| 2007/0040449 A1 | 2/2007 | Spurlin et al. |
| 2007/0044523 A1 | 3/2007 | Davis |
| 2007/0046651 A1 | 3/2007 | Sinclair |
| 2007/0061155 A1 | 3/2007 | Ji et al. |
| 2007/0074702 A1 | 4/2007 | Nakamura et al. |
| 2007/0094153 A1 | 4/2007 | Ferraro |
| 2007/0114849 A1 | 5/2007 | Falik et al. |
| 2007/0119682 A1 | 5/2007 | Banks et al. |
| 2007/0129974 A1 | 6/2007 | Chen et al. |
| 2007/0136128 A1 | 6/2007 | Janacek et al. |
| 2007/0171069 A1 | 7/2007 | Allen |
| 2007/0184852 A1 | 8/2007 | Johnson et al. |
| 2007/0189907 A1 | 8/2007 | Kunihiro et al. |
| 2007/0208499 A1 | 9/2007 | Kwong |
| 2007/0210935 A1 | 9/2007 | Yost et al. |
| 2007/0276724 A1 | 11/2007 | Catt |
| 2007/0285281 A1 | 12/2007 | Welch |
| 2008/0052254 A1 | 2/2008 | Al Amri |
| 2008/0071611 A1 | 3/2008 | Lovett |
| 2008/0093454 A1 | 4/2008 | Yamazaki et al. |
| 2008/0147268 A1 | 6/2008 | Fuller |
| 2008/0158010 A1 | 7/2008 | Nath et al. |
| 2008/0165030 A1 | 7/2008 | Kuo et al. |
| 2008/0208480 A1 | 8/2008 | Kuriyama et al. |
| 2008/0208680 A1 | 8/2008 | Cho |
| 2008/0218383 A1 | 9/2008 | Franklin et al. |
| 2008/0238715 A1 | 10/2008 | Cheng et al. |
| 2008/0245638 A1 | 10/2008 | King et al. |
| 2008/0257965 A1 | 10/2008 | Klein et al. |
| 2008/0265019 A1 | 10/2008 | Artino et al. |
| 2008/0266138 A1 | 10/2008 | Ponert |
| 2008/0270227 A1 | 10/2008 | Al Amri |
| 2008/0277468 A1 | 11/2008 | Mitschele |
| 2008/0289030 A1 | 11/2008 | Poplett |
| 2008/0291054 A1 | 11/2008 | Groft |
| 2008/0296365 A1 | 12/2008 | Schliebe |
| 2008/0319837 A1 | 12/2008 | Mitschele |
| 2009/0026842 A1 | 1/2009 | Hunter et al. |
| 2009/0032368 A1 | 2/2009 | Hunter et al. |
| 2009/0049875 A1 | 2/2009 | Buhl et al. |
| 2009/0057398 A1 | 3/2009 | Douglass et al. |
| 2009/0083149 A1 | 3/2009 | Maekawa et al. |
| 2009/0095593 A1 | 4/2009 | King et al. |
| 2009/0099761 A1 | 4/2009 | Davis et al. |
| 2009/0102726 A1 | 4/2009 | Imano et al. |
| 2009/0109062 A1 | 4/2009 | An |
| 2009/0121889 A1* | 5/2009 | Lin ................ G06F 1/3231 340/686.6 |
| 2009/0137204 A1 | 5/2009 | Chang et al. |
| 2009/0146796 A1 | 6/2009 | Goto et al. |
| 2009/0159674 A1 | 6/2009 | King et al. |
| 2009/0183966 A1 | 7/2009 | King et al. |
| 2009/0192950 A1 | 7/2009 | King et al. |
| 2009/0199966 A1 | 8/2009 | Coleman et al. |
| 2009/0254438 A1 | 10/2009 | Johnson, Jr. et al. |
| 2009/0267732 A1 | 10/2009 | Chauvin et al. |
| 2009/0284907 A1 | 11/2009 | Regimbal et al. |
| 2009/0287578 A1 | 11/2009 | Paluszek et al. |
| 2009/0315720 A1 | 12/2009 | Clement et al. |
| 2010/0019936 A1 | 1/2010 | Kaveler |
| 2010/0025459 A1 | 2/2010 | Yamada |
| 2010/0026522 A1 | 2/2010 | Ward, II |
| 2010/0030629 A1 | 2/2010 | Ward, II |
| 2010/0060479 A1 | 3/2010 | Salter |
| 2010/0103100 A1 | 4/2010 | Yamamoto |
| 2010/0106517 A1 | 4/2010 | Kociubinski et al. |
| 2010/0116883 A1 | 5/2010 | Cost et al. |
| 2010/0153193 A1 | 6/2010 | Ashby et al. |
| 2010/0161489 A1 | 6/2010 | Goodall et al. |
| 2010/0185325 A1 | 7/2010 | Shani |
| 2010/0187300 A1 | 7/2010 | Ramachandran et al. |
| 2010/0188932 A1 | 7/2010 | Hanks et al. |
| 2010/0241056 A1 | 9/2010 | Lehtoluoto |
| 2010/0241564 A1 | 9/2010 | Miller et al. |
| 2010/0243729 A1 | 9/2010 | Russell et al. |
| 2010/0328104 A1 | 12/2010 | Groft |
| 2010/0332394 A1 | 12/2010 | Ioli |
| 2011/0015934 A1 | 1/2011 | Rowe et al. |
| 2011/0022427 A1 | 1/2011 | Dayan |
| 2011/0037562 A1 | 2/2011 | Braukmann et al. |
| 2011/0057815 A1 | 3/2011 | King et al. |
| 2011/0060653 A1 | 3/2011 | King et al. |
| 2011/0062230 A1 | 3/2011 | Ward, II |
| 2011/0063133 A1 | 3/2011 | Keller et al. |
| 2011/0066297 A1 | 3/2011 | Saberi et al. |
| 2011/0079564 A1 | 4/2011 | Palmer |
| 2011/0093314 A1 | 4/2011 | Redmann et al. |
| 2011/0106329 A1 | 5/2011 | Donnelly et al. |
| 2011/0122036 A1 | 5/2011 | Leung et al. |
| 2011/0133613 A1 | 6/2011 | Descamps et al. |
| 2011/0158331 A1 | 6/2011 | Kavaler et al. |
| 2011/0203901 A1 | 8/2011 | King et al. |
| 2011/0205087 A1 | 8/2011 | Kell et al. |
| 2011/0218940 A1 | 9/2011 | Bergstrom et al. |
| 2011/0221624 A1 | 9/2011 | Kavaler |
| 2011/0241442 A1 | 10/2011 | Mittleman et al. |
| 2011/0241604 A1 | 10/2011 | Anderson |
| 2011/0261548 A1 | 10/2011 | Gandhi |
| 2011/0276519 A1 | 11/2011 | MacKay et al. |
| 2011/0289985 A1 | 12/2011 | MacKay et al. |
| 2011/0313822 A1 | 12/2011 | Burdick |
| 2011/0316716 A1 | 12/2011 | MacKay et al. |

(56) References Cited

U.S. PATENT DOCUMENTS

| | | |
|---|---|---|
| 2011/0320243 A1 | 12/2011 | Khan |
| 2011/0320256 A1 | 12/2011 | Florucci et al. |
| 2011/0322025 | 12/2011 | Florucci et al. |
| 2012/0026015 A1 | 2/2012 | Kavaler |
| 2012/0073222 A1 | 3/2012 | Sargentini |
| 2012/0078686 A1 | 3/2012 | Bashani |
| 2012/0084210 A1 | 4/2012 | Farahmand |
| 2012/0158466 A1 | 6/2012 | John |
| 2012/0173171 A1 | 7/2012 | Bajwa et al. |
| 2012/0197806 A1 | 8/2012 | Hill |
| 2012/0208521 A1 | 8/2012 | Häger et al. |
| 2012/0215375 A1 | 8/2012 | Chang |
| 2012/0222935 A1 | 9/2012 | MacKay et al. |
| 2012/0223841 A1 | 9/2012 | Chauvin et al. |
| 2012/0255333 A1 | 10/2012 | MacKay et al. |
| 2012/0273322 A1 | 11/2012 | MacKay et al. |
| 2012/0285790 A1 | 11/2012 | Jones et al. |
| 2012/0285791 A1 | 11/2012 | Jones et al. |
| 2012/0285792 A1 | 11/2012 | Jones et al. |
| 2012/0285793 A1 | 11/2012 | Jones et al. |
| 2012/0286036 A1 | 11/2012 | Jones et al. |
| 2012/0286968 A1 | 11/2012 | Jones et al. |
| 2012/0292385 A1 | 11/2012 | MacKay et al. |
| 2013/0005445 A1 | 1/2013 | Walker et al. |
| 2013/0016952 A1 | 1/2013 | Knuth |
| 2013/0021201 A1 | 1/2013 | del Castillo et al. |
| 2013/0027218 A1 | 1/2013 | Schwarz et al. |
| 2013/0085928 A1 | 4/2013 | McKinney |
| 2013/0099943 A1 | 4/2013 | Subramanya |
| 2013/0116952 A1 | 5/2013 | Chai |
| 2013/0124270 A1 | 5/2013 | Tziperman et al. |
| 2013/0231985 A1 | 9/2013 | MacKay et al. |
| 2013/0238406 A1 | 9/2013 | King et al. |
| 2013/0257589 A1 | 10/2013 | Mohiuddin et al. |
| 2013/0285455 A1 | 10/2013 | Hunter et al. |
| 2014/0040028 A1 | 2/2014 | King et al. |
| 2014/0041301 A1 | 2/2014 | Oakely et al. |
| 2014/0058805 A1 | 2/2014 | Paesler et al. |
| 2014/0108107 A1 | 4/2014 | Jones et al. |
| 2014/0129158 A1 | 5/2014 | Shea |
| 2014/0139360 A1 | 5/2014 | Vilajosana Guillen et al. |
| 2014/0172518 A1 | 6/2014 | King et al. |
| 2014/0174880 A1 | 6/2014 | MacKay et al. |
| 2014/0174881 A1 | 6/2014 | King et al. |
| 2014/0210646 A1 | 7/2014 | Subramanya |
| 2014/0213176 A1 | 7/2014 | Mendelson |
| 2014/0214499 A1 | 7/2014 | Hudson et al. |
| 2014/0214500 A1 | 7/2014 | Hudson et al. |
| 2014/0218527 A1 | 8/2014 | Subramanya |
| 2014/0229246 A1 | 8/2014 | Ghaffari |
| 2014/0231505 A1 | 8/2014 | King et al. |
| 2014/0279565 A1 | 9/2014 | Trump et al. |
| 2014/0289025 A1 | 9/2014 | King et al. |
| 2014/0319211 A1 | 10/2014 | MacKay et al. |
| 2015/0000511 A1 | 1/2015 | Engl |
| 2015/0045984 A1 | 2/2015 | Hui et al. |
| 2015/0068827 A1 | 3/2015 | Makitalo et al. |
| 2015/0084786 A1 | 3/2015 | King et al. |
| 2015/0106172 A1 | 4/2015 | Salama |
| 2015/0129391 A1 | 4/2015 | Jones et al. |
| 2015/0134460 A1 | 5/2015 | Tian et al. |
| 2015/0191178 A1 | 7/2015 | Roy et al. |
| 2015/0235503 A1 | 8/2015 | King et al. |
| 2015/0242605 A1 | 8/2015 | Du et al. |
| 2015/0283902 A1 | 10/2015 | Tuukkanen |
| 2015/0288932 A1 | 10/2015 | Smith et al. |
| 2015/0332587 A1 | 11/2015 | Schwarz et al. |
| 2015/0333598 A1 | 11/2015 | Conticchio et al. |
| 2015/0341241 A1 | 11/2015 | Robertson |
| 2015/0371483 A1 | 12/2015 | Sun |
| 2015/0376891 A1 | 12/2015 | Laurindo |
| 2016/0001782 A1 | 1/2016 | Fiedler |
| 2016/0012418 A1 | 1/2016 | MacKay et al. |
| 2016/0012602 A1 | 1/2016 | Xu et al. |
| 2016/0069557 A1 | 3/2016 | Rückgauer |
| 2016/0086397 A1 | 3/2016 | Phillips |
| 2016/0133085 A1 | 5/2016 | Eagon et al. |
| 2016/0163119 A1 | 6/2016 | Bashani |
| 2016/0268838 A1 | 9/2016 | Hunter et al. |
| 2016/0321714 A1 | 11/2016 | King et al. |
| 2016/0371915 A1 | 12/2016 | MacKay et al. |
| 2017/0034600 A1 | 2/2017 | King et al. |
| 2017/0083043 A1* | 3/2017 | Bowers ............... G06F 1/20 |
| 2017/0098339 A1 | 4/2017 | Keller et al. |
| 2017/0116857 A1 | 4/2017 | Moran et al. |
| 2017/0148230 A1 | 5/2017 | Richard |
| 2017/0154368 A1 | 6/2017 | Jones et al. |
| 2017/0168155 A1 | 6/2017 | Richard |
| 2017/0186054 A1 | 6/2017 | Fish et al. |
| 2017/0193734 A1 | 7/2017 | King et al. |
| 2017/0197586 A1 | 7/2017 | Kawamura et al. |
| 2017/0206716 A1 | 7/2017 | King et al. |
| 2017/0213262 A1 | 7/2017 | Kelley et al. |
| 2017/0256983 A1 | 9/2017 | Hunter et al. |
| 2017/0320501 A1 | 11/2017 | Li et al. |
| 2017/0323227 A1 | 11/2017 | Sadeghi |
| 2017/0323513 A1 | 11/2017 | Jones et al. |
| 2017/0325082 A1 | 11/2017 | France |
| 2017/0369071 A1 | 12/2017 | Gould et al. |
| 2018/0018179 A1 | 1/2018 | Scheufler et al. |
| 2018/0025549 A1 | 1/2018 | King et al. |
| 2018/0025550 A1 | 1/2018 | Hudson et al. |
| 2018/0025629 A1 | 1/2018 | Schwarz et al. |
| 2018/0068337 A1 | 3/2018 | Fiorucci et al. |
| 2018/0082488 A1 | 3/2018 | King et al. |
| 2018/0082489 A1 | 3/2018 | King et al. |
| 2018/0082490 A1 | 3/2018 | King et al. |
| 2018/0160282 A1 | 6/2018 | van de Poll |
| 2018/0225909 A1 | 8/2018 | MacKay et al. |
| 2018/0322534 A1 | 11/2018 | King et al. |
| 2018/0339708 A1 | 11/2018 | Geller |
| 2018/0342165 A1 | 11/2018 | Sweeney et al. |
| 2018/0350185 A1 | 12/2018 | King et al. |
| 2019/0062914 A1 | 2/2019 | King et al. |
| 2019/0066424 A1 | 2/2019 | Hassani et al. |
| 2019/0073837 A1 | 3/2019 | Oliver |
| 2019/0131819 A1 | 5/2019 | Bell |
| 2019/0220011 A1 | 7/2019 | Della Penna |
| 2019/0227954 A1 | 7/2019 | Shi |
| 2019/0236940 A1 | 8/2019 | Schwarz et al. |
| 2019/0251608 A1 | 8/2019 | King et al. |
| 2019/0272680 A1 | 9/2019 | King et al. |
| 2019/0272681 A1 | 9/2019 | King et al. |
| 2019/0304203 A1 | 10/2019 | King et al. |
| 2019/0362383 A1 | 11/2019 | King et al. |
| 2019/0370923 A1 | 12/2019 | Randall et al. |
| 2019/0385454 A1 | 12/2019 | King et al. |
| 2020/0160263 A1 | 5/2020 | Kuettner |
| 2020/0276503 A1 | 9/2020 | Marchiorello |
| 2020/0310528 A1 | 10/2020 | Upmanue et al. |
| 2020/0334581 A1 | 10/2020 | Skaling |
| 2020/0349666 A1 | 11/2020 | Hodge et al. |
| 2020/0364967 A1 | 11/2020 | Spice |
| 2021/0319485 A1 | 10/2021 | King et al. |
| 2021/0344218 A1 | 11/2021 | Hunter et al. |
| 2022/0030335 A1 | 1/2022 | King et al. |
| 2022/0076303 A1 | 3/2022 | King et al. |
| 2022/0076304 A1 | 3/2022 | King et al. |
| 2022/0076305 A1 | 3/2022 | King et al. |
| 2023/0005369 A1 | 1/2023 | King et al. |
| 2023/0057773 A1 | 2/2023 | King et al. |
| 2023/0072870 A1 | 3/2023 | Marvi et al. |

FOREIGN PATENT DOCUMENTS

| | | |
|---|---|---|
| AU | 2006203554 A1 | 9/2006 |
| AU | 314132 | 5/2007 |
| AU | 315845 | 8/2007 |
| AU | 315846 | 8/2007 |
| AU | 315847 | 8/2007 |
| CA | 2186406 | 3/1996 |
| CA | 2233931 A1 | 4/1997 |
| CA | 2248347 C | 10/1997 |
| CA | 2448347 C | 10/1997 |

(56) References Cited

FOREIGN PATENT DOCUMENTS

| | | |
|---|---|---|
| CA | 2511461 C | 10/1997 |
| CA | 2260925 A1 | 1/1998 |
| CA | 2186406 | 3/1998 |
| CA | 2227833 C | 7/1998 |
| CA | 2346908 A1 | 4/2000 |
| CA | 2302922 C | 9/2000 |
| CA | 2352968 A1 | 4/2001 |
| CA | 2373400 A1 | 8/2001 |
| CA | 2401429 A1 | 9/2001 |
| CA | 2377010 A1 | 10/2001 |
| CA | 2357179 A1 | 3/2002 |
| CA | 2437722 A1 | 8/2002 |
| CA | 2387540 | 11/2002 |
| CA | 2387540 C | 11/2002 |
| CA | 2453369 A1 | 1/2003 |
| CA | 2363915 A1 | 5/2003 |
| CA | 2413198 A1 | 5/2003 |
| CA | 2414132 A1 | 6/2003 |
| CA | 2387540 | 11/2003 |
| CA | 2453369 | 1/2004 |
| CA | 2443677 A1 | 3/2004 |
| CA | 2443677 C | 3/2004 |
| CA | 2595309 A1 | 7/2006 |
| CA | 2631699 A1 | 6/2007 |
| CA | 2622164 C | 8/2008 |
| CA | 122930 | 9/2008 |
| CA | 126745 | 9/2008 |
| CA | 2693911 A1 | 1/2009 |
| CA | 2650192 A1 | 7/2009 |
| CA | 2650195 A1 | 7/2009 |
| CA | 2650195 C | 7/2009 |
| CA | 2933066 A1 | 7/2009 |
| CA | 2745368 C | 7/2010 |
| CA | 134041 | 9/2010 |
| CA | 134042 | 9/2010 |
| CA | 2773132 C | 3/2011 |
| CA | 2773135 A1 | 3/2011 |
| CA | 2374155 | 3/2012 |
| CA | 2870544 C | 5/2012 |
| CA | 2870592 A1 | 5/2012 |
| CA | 2773250 C | 9/2012 |
| CA | 2770093 A1 | 5/2013 |
| CA | 2870592 A1 | 5/2013 |
| CA | 142346 | 7/2013 |
| CA | 145137 | 7/2013 |
| CA | 155382 | 5/2015 |
| CA | 155383 | 5/2015 |
| CA | 155391 | 5/2015 |
| CA | 156990 | 5/2015 |
| CA | 156991 | 5/2015 |
| CA | 156992 | 5/2015 |
| CA | 156993 | 5/2015 |
| CA | 156994 | 5/2015 |
| CA | 156995 | 5/2015 |
| CA | 157067 | 5/2015 |
| CA | 157068 | 5/2015 |
| CA | 157069 | 5/2015 |
| CA | 161049 | 10/2015 |
| CA | 160598 | 2/2016 |
| CA | 163369 | 2/2016 |
| CA | 163370 | 2/2016 |
| CA | 2900177 A1 | 2/2017 |
| CA | 2908793 A1 | 2/2017 |
| CA | 2932667 A1 | 2/2017 |
| CA | 168171 | 3/2017 |
| CA | 168172 | 3/2017 |
| CA | 168173 | 3/2017 |
| CA | 168198 | 3/2017 |
| CA | 168199 | 3/2017 |
| CA | 168200 | 3/2017 |
| CA | 171649 | 11/2017 |
| CA | 171650 | 11/2017 |
| CA | 171651 | 11/2017 |
| CA | 171652 | 11/2017 |
| CA | 171653 | 11/2017 |
| CA | 171654 | 11/2017 |
| CN | 1037604 A | 11/1989 |
| CN | 2395344 | 9/2000 |
| CN | 2395344 Y | 9/2000 |
| CN | 2470887 | 1/2002 |
| CN | 2470887 Y | 1/2002 |
| CN | 2544352 | 4/2003 |
| CN | 2544352 Y | 4/2003 |
| CN | 1549990 | 11/2004 |
| CN | 1549990 A | 11/2004 |
| CN | 201303054 Y | 9/2009 |
| CN | 305987969 | 8/2020 |
| DE | 2804085 | 8/1978 |
| DE | 2804085 A1 | 8/1978 |
| DE | 2750193 | 5/1979 |
| DE | 2750193 A1 | 5/1979 |
| DE | 102005041290 | 3/2007 |
| DE | 102005041290 A1 | 3/2007 |
| EP | 0265328 A1 | 4/1988 |
| EP | 0329129 A3 | 8/1989 |
| EP | 0933288 A2 | 4/1999 |
| EP | 0933288 A2 | 8/1999 |
| EP | 0980055 A1 | 2/2000 |
| EP | 1327962 A2 | 7/2003 |
| EP | 1376491 A1 | 2/2004 |
| EP | 1748393 A1 | 1/2007 |
| EP | 1128350 B1 | 10/2007 |
| EP | 1898360 | 3/2008 |
| EP | 1898360 A1 | 3/2008 |
| EP | 2215605 B1 | 8/2012 |
| EP | 1898360 | 2/2013 |
| EP | 002416206-0001 A1 | 3/2014 |
| EP | 002416206-0002 A1 | 3/2014 |
| EP | 002416206-0003 A1 | 3/2014 |
| EP | 002479352-0001 A1 | 6/2014 |
| EP | 002479352-0002 A1 | 6/2014 |
| EP | 002479352-0003 A1 | 6/2014 |
| EP | 002479360-0001 A1 | 6/2014 |
| EP | 002479360-0002 A1 | 6/2014 |
| EP | 002479360-0003 A1 | 6/2014 |
| EP | 002479425-0002 A1 | 6/2014 |
| EP | 002479428-0001 A1 | 6/2014 |
| EP | 002479428-0003 A1 | 6/2014 |
| EP | 003076702-0001 A1 | 4/2016 |
| EP | 003076702-0002 A1 | 4/2016 |
| EP | 003076702-0003 A1 | 4/2016 |
| EP | 003076702-0004 A1 | 4/2016 |
| EP | 003076702-0005 A1 | 4/2016 |
| EP | 003076702-0006 A1 | 4/2016 |
| EP | 003462183-0001 A1 | 11/2016 |
| EP | 003462183-0002 A1 | 11/2016 |
| EP | 003462183-0003 A1 | 11/2016 |
| EP | 003462183-0004 A1 | 11/2016 |
| EP | 003462183-0005 A1 | 11/2016 |
| EP | 003462183-0006 A1 | 11/2016 |
| EP | 004415164-0001 | 10/2017 |
| EP | 004415164-0002 | 10/2017 |
| EP | 004415164-0003 | 10/2017 |
| EP | 004415164-0004 | 10/2017 |
| EP | 004415164-0005 | 10/2017 |
| EP | 004415164-0006 | 10/2017 |
| EP | 006836128-0001 | 9/2019 |
| EP | 006836128-0002 | 9/2019 |
| EP | 006836128-0003 | 9/2019 |
| EP | 006836128-0004 | 9/2019 |
| EP | 006836128-0005 | 9/2019 |
| EP | 006836128-0006 | 9/2019 |
| EP | 006836128-0007 | 9/2019 |
| EP | 006836128-0008 | 9/2019 |
| EP | 006836128-0009 | 9/2019 |
| FR | 2600448 A1 | 12/1987 |
| FR | 2837583 | 9/2003 |
| FR | 2837583 A1 | 9/2003 |
| GB | 1237579 | 6/1971 |
| GB | 1283555 | 7/1972 |
| GB | 1431862 | 4/1976 |
| GB | 2077475 A | 12/1981 |
| GB | 2155228 | 9/1985 |
| GB | 2155228 A | 9/1985 |

(56) References Cited

FOREIGN PATENT DOCUMENTS

| | | |
|---|---|---|
| GB | 2284919 A | 6/1995 |
| GB | 2298510 A | 6/1996 |
| IL | 149880 A | 6/2007 |
| JP | 58121494 | 7/1983 |
| JP | 58121494 A | 7/1983 |
| JP | 6437661 | 2/1989 |
| JP | S6437661 A | 2/1989 |
| JP | 01165494 | 6/1989 |
| JP | 01303026 | 12/1989 |
| JP | H0298692 A | 1/1990 |
| JP | 0261771 | 3/1990 |
| JP | H0261711 A | 3/1990 |
| JP | H02180623 A | 7/1990 |
| JP | 03253992 | 11/1991 |
| JP | 0487533 | 3/1992 |
| JP | H0487533 A | 3/1992 |
| JP | 08305998 | 11/1996 |
| JP | H08305998 A | 11/1996 |
| JP | 2002042181 | 2/2002 |
| JP | 2002074430 | 3/2002 |
| JP | 2002074430 A | 3/2002 |
| JP | 2002099640 | 4/2002 |
| JP | 2002099640 A | 4/2002 |
| JP | 2002528799 | 9/2002 |
| JP | 2002528799 A | 9/2002 |
| JP | 2003169133 A | 6/2003 |
| JP | 2003527701 | 9/2003 |
| JP | 2003527701 A | 9/2003 |
| JP | 2005242888 | 9/2005 |
| JP | 2005242888 A | 9/2005 |
| JP | 2005267430 | 9/2005 |
| JP | 2005267430 A | 9/2005 |
| JP | 2007052773 | 3/2007 |
| JP | 2007052773 A | 3/2007 |
| JP | 4240927 B2 | 3/2009 |
| JP | 2011060206 | 3/2011 |
| JP | 2011060206 A | 3/2011 |
| JP | 5259000 B1 | 8/2013 |
| KR | 10-20000016671 | 3/2000 |
| KR | 20000016671 A | 3/2000 |
| KR | 10-20000030290 | 6/2000 |
| KR | 10-20010028481 | 4/2001 |
| KR | 20010028481 A | 4/2001 |
| KR | 10-20050038077 | 4/2005 |
| KR | 102005038077 A | 4/2005 |
| KR | 100693204 B1 | 3/2007 |
| KR | 10-20080026282 | 3/2008 |
| KR | 1020080026282 A | 3/2008 |
| KR | 10-20080041730 | 5/2008 |
| KR | 20080041730 A | 5/2008 |
| MX | 2008007047 | 8/2008 |
| MX | 2008007047 A | 8/2008 |
| NZ | 530606 | 11/2006 |
| NZ | 20020530606 A | 11/2006 |
| WO | 198100778 A1 | 3/1981 |
| WO | 1995020204 | 7/1995 |
| WO | 199611453 A1 | 4/1996 |
| WO | 199712345 A1 | 4/1997 |
| WO | 1997033341 A1 | 9/1997 |
| WO | 199737328 A1 | 10/1997 |
| WO | 199804080 A1 | 1/1998 |
| WO | 200059201 A1 | 10/2000 |
| WO | 200124127 A1 | 4/2001 |
| WO | WO2001024127 A1 | 4/2001 |
| WO | 200169541 A1 | 9/2001 |
| WO | 200180157 A1 | 10/2001 |
| WO | 2002063570 A2 | 8/2002 |
| WO | 2003005324 A1 | 1/2003 |
| WO | 2003009238 A1 | 1/2003 |
| WO | 2004012352 A1 | 2/2004 |
| WO | 2005027035 A1 | 3/2005 |
| WO | 2005031494 A2 | 4/2005 |
| WO | 2006076773 A1 | 7/2006 |
| WO | 2006095352 A2 | 9/2006 |
| WO | 2007063530 | 6/2007 |
| WO | 2007063530 A2 | 6/2007 |
| WO | 2009009854 A1 | 1/2009 |
| WO | 2009154787 | 12/2009 |
| WO | 2009154787 A2 | 12/2009 |
| WO | 2010008610 A2 | 1/2010 |
| WO | 2010071972 A1 | 7/2010 |
| WO | 2010071974 A1 | 7/2010 |
| WO | 2011029061 A2 | 3/2011 |
| WO | 2011029062 A2 | 3/2011 |
| WO | 2012015453 A1 | 2/2012 |
| WO | 2012092609 A2 | 7/2012 |
| WO | 2012154902 A1 | 11/2012 |
| WO | 2012154913 A2 | 11/2012 |
| WO | 2013016453 A2 | 1/2013 |
| WO | 2013049418 A2 | 4/2013 |
| WO | 2014014494 A1 | 1/2014 |
| WO | 2014127384 A1 | 8/2014 |
| WO | 2014152369 A3 | 9/2014 |
| WO | 2017024397 A1 | 2/2017 |
| WO | WO2017024396 A1 | 2/2017 |
| WO | WO2017024397 A1 | 2/2017 |
| WO | 2017024396 A1 | 2/2019 |

OTHER PUBLICATIONS

Duncan Solutions—VM Pay-by-Spcae Multi-Space Meter brochure, 2013 (2 pages).

Duncan, Duncan VM-Solar Power meter photograph, pre-Mar. 2011 (1 page).

Duncan Solutions, Duncan VS, 2006 (2 pages).

McCullagh, D., "Hackers: We can bypass San Francisco e-parking meters," Jul. 30, 2009, http://news.cnet.com (2 pages).

Exhibit 1003—Declaration of Todd Magness in Support of Petition for Inter Partes Review of U.S. Pat. No. 7,854,310, dated Oct. 21, 2015 (70 pages).

Exhibit 1004—Declaration of Anderson Moore in Support of Petition for Inter Partes Review of U.S. Pat. No. 8,595,054, dated Oct. 21, 2015 (19 pages).

Exhibit 1005—U.S. Appl. No. 60/741,920, filed Dec. 2, 2005 (20 pages).

Exhibit 1009—Tung, Y., "Design of an Advanced On-street Parking Meter," Thesis, Rochester Institute of Technology, 2001 (75 pages).

Exhibit 1010—Christian, S. E., "Parking Meter Winding Up for Computer Age," Chicago Tribune, May 19, 1995 (6 pages).

Exhibit 1011—Associated Press, "New parking meters based on computer," The San Diego Union, Feb. 1, 1987 (1 page).

Exhibit 1012—Lunden, J., Good Morning America transcript, Nov. 6, 1986 (3 pages).

Exhibit 1013—Luke Parking Station ad (p. 28), Parking Today, vol. 10, No. 4, Apr. 2005 (64 pages)—Part 1.

Exhibit 1014—Blass, E., "Changing times," Lansing State Journal, Feb. 19, 1987 (1 page).

Exhibit 1015—Gabriele, M.C., "Electronic Parking Meters Rival Mechanical Units," American Metal Market/Metalworking News, Sep. 29, 1986 (1 page).

Exhibit 1016—Sandler, L., "Lovely Visa, meter maid: Use credit card to park," Milwaukee Journal Sentinel, Jun. 13, 2005 (1 page).

Exhibit 1017—Item for Finance Commitee, "Capital Works Reserve Fund, Head 708—Capital Subventions and Major Systems and Equipment," FCR(2002-03)18, May 24, 2002 (15 pages).

Exhibit 1018—Anonymous, "Happy %#@! Anniversary, First Parking Meter Installed Jul. 16, 1935," The Expired Meter News, Views, Information on Driving in Chicago, Jul. 16, 2009 (10 pages).

Exhibit 1019—Anonymous, "Parking Meter Patented 72 Years Ago Today", The Expired Meter News, Views Information on Driving in Chicago, May 24, 2010 (6 pages).

Exhibit 1032—U.S. Pat. No. 5,570,771 to Jacobs, Nov. 5, 1996 (29 pages).

Exhibit 1034—Anonymous, "Smart Cards and Parking," TC-06001, Smart Card Alliance Transportation Council White Paper, Jan. 2006 (52 pages).

Exhibit 1037—Catalog Entry for Exhibit 1009, Tung, Y., "Design of an advanced on-street parking meter," Oct. 18, 2015 (2 pages).

(56) References Cited

OTHER PUBLICATIONS

Exhibit 1038—POM Parking Meters website, Oct. 20, 2015 (4 pages).
IPS Group Inc., Exhibit 2001, Design of an advanced on-street parking meter, Jan. 12, 2016 (2 pages).
IPS Group Inc., Exhibit 2002, About RIT Digital Media Library, Jan. 12, 2016 (1 page).
IPS Group Inc., Exhibit 2003, The U.S. Conference of Mayors Presents 'Best-Practice' Awards, Jan. 20, 2012 (2 pages).
IPS Group Inc., Exhibit 2004, City of Los Angeles, Card & Coin Parking Meter Lease, Nov. 29, 2010 (4 pages).
IPS Group Inc., Exhibit 2005, City of Culver City, California, Approval of a Contract with IPS Group Inc., for the Sole-Source Purchase of 1,000 Parking Meters, Dec. 12, 2011 (3 pages).
IPS Group Inc., Exhibit 2006, City of San Luis Obispo City Manager Report, Award of Credit Card Meters and Service Contract, RFP Specification No. 91137, Jan. 20, 2012 (5 pages).
IPS Group Inc., Exhibit 2007, Walnut Creek, Alternate Downtown Parking Pay Technology, Oct. 20, 2011 (4 pages).
IPS Group Inc., Exhibit 2008, How M2M Maximizes Denver's Revenue, Oct. 2011 (4 pages).
IPS Group Inc., Exhibit 2009, Somerville, MA, T&P Introduces User-Friendly Parking Meters & Service Upgrades with Electronic Meter Pilot, Apr. 19, 2011 (2 pages).
Fidelman, C., "Time's running out for parking meters at present locations: $270,000 cited as replacement cost. City employees who ticket motorists find electronic meters unsuitable," The Gazette, Final Edition, Montreal, Quebec, Canada, Nov. 12, 2002, p. A7 (2 pages).
Flatley, J., "In San Francisco, hackers park for free," posted Jul. 31, 2009, www.engadget.com (1 page).
Digital Payment Technologies, Response to Request for Proposal for Multi-Space Parking Meters, City of Fort Lauderdale, Jan. 13, 2010 (89 pages).
Howland, S., "How M2M Maximizes Denver's Revenue," FieldTechnologiesOnline.com, Oct. 2011, pp. 9-12 (4 pages).
Max Dual Space Meter advertisement, Jun. 25, 2015 (2 pages).
IPS Multi Bay Parking Meter product description, http://www.design-industry.com.au/work/multi-bay-parking-meter/, Oct. 6, 2015 (6 pages).
Reino Parking Systems: On-Street Service Procedures, Jun. 29, 2004 (19 pages).
Reino Meter Advertisement, The power of a paystation, Parking Today, Aug. 2003 (1 page).
Duncan Solutions/Reino, RSV3 Digital Parking Meter, Jul. 5, 2011 (2 pages).
Reino, RSV3 brochure, Nov. 10, 2007 (4 pages).
Digital Payment Technologies, Sierra Wireless Case Study, Dec. 7, 2009 (2 pages).
IPS Single Bay Parking Meter product description, http://www.design-industry.com.au/work/ips-single-parking-meter/, Oct. 6, 2015 (6 pages).
StreetSmart Technology, LLC, "Technical Specifications and System Features for the StreetSmart Solution" Brochure, May 2011 (8 pages).
Digital Payment Technologies, Digital Payment Technologies and PXT Payments Forge Partnership to Bring Cities Smart Parking Meters and Merchant Loyalty Debit Cards, www.digitalpaytech.com, Apr. 27, 2010 (2 pages).
(Cell Net Data Systems) "First Wireless Monitoring of Parking Meters Results in Theft Arrests Using CellNet Data Systems Technology," PRNewswire, May 11, 1999 (3 pages).
Basu et al., "Networked Parking Spaces: Architecture and Appliances," MCL Technical Report No. Jul. 1, 2002, Proc. IEEE Vehicular Transportation Conference, Vancouver, Canada, Sep. 2002 (10 pages).
Burden et al., "Near Field Communications (NFC) in Public Transport," Digital Identity Forum, 2006 (18 pages).
Exhibit 1013—Luke Parking Station ad (p. 28), Parking Today, vol. 10, No. 4, Apr. 2005 (64 pages)—Part 2.

POM_APM_Photo_IMG_20120423_00351.
POM_APM_Photo_IMG_20120423_00350.
POM_APM_Photo_IMG_20120423_00348.
POM_APM_Photo_IMG_20120423_00346.
POM_APM_Photo_IMG_20120423_00344.
POM_APM_Photo_IMG_20120423_00342.
POM_APM_Photo_IMG_20120423_00341.
POM_APM_Photo_IMG_20120423_00340.
POM_APM_Photo_IMG_20120423_00339.
POM_APM_Photo_IMG_20120423_00338.
POM_APM_Photo_IMG_20120423_00337.
POM_APM_Photo_IMG_20120423_00336.
POM_APM_Photo_DSC06395.
POM_APM_Photo_4Xfront.
POM_APM_Photo_10_03_11_1537.
POM_APM_Photo_10_03_11_1538.
POM_APM_Photo_10_03_11_1539.
POM_APM_Photo_apm2xcrop.
POM_APM_Photo_apm2xyellow.
POM_APM_Photo_DSC06379.
POM_APM_Photo_DSC06380.
POM_APM_Photo_DSC06381.
POM_APM_Photo_DSC06382.
POM_APM_Photo_DSC06383.
POM_APM_Photo_DSC06384.
POM_APM_Photo_DSC06385.
POM_APM_Photo_DSC06386.
POM_APM_Photo_DSC06387.
POM_APM_Photo_DSC06389.
POM_APM_Photo_DSC06390.
POM_APM_Photo_DSC06391.
POM_APM_Photo_DSC06393.
POM_APM_Photo_DSC06394.
Byrd, Dennis, "City officials plug solar-powered parking meters, Electronic eye ends free parking," Lawrence Journal World, Apr. 30, 1989, p. 11C (1 Page).
Anonymous, "The Originators of Metered Parking, Series II, APM-E Mechanism, Service Manual," POM Incorporated, May 23, 2006 revision (22 pages).
POM APM Solar Powered Meter advertisements, dated Apr. 28, 2010 (5 pages).
CWT MAX Single/Dual Space Meter, Technical Data, May 18, 2016 (4 pages).
Digital Payment Technologies—Luke brochure, dated prior to Jun. 15, 2015 (4 pages).
Digital Payment Technologies, Request for Proposal #B09030—Parking Pay Stations, City of Dover, New Hampshire, Oct. 22, 2008 (part 1; 110 pages).
Digital Payment Technologies, Request for Proposal #B09030—Parking Pay Stations, City of Dover, New Hampshire, Oct. 22, 2008 (part 2; 160 pages).
Digital Payment Technologies, Technologies Launches Luke II Multi-Space Parking Pay Station, May 16, 2011 (3 pages).
Digital Payment Technologies—Luke website, https://web.archive.org/web/20061025094839/http:www.digitalpaytech.com/luke.html, Oct. 25, 2006 (5 pages).
Duncan Solutions—Eagle CK brochure, 2013 (2 pages).
Transcript & Screenshots of https://web.archive.org/web/20080222104246/http://www.photoviolation.com/videos/PCM.wmv, Photo Violation Technologies Corp.—"ParkCardMeter TM System," dated prior to Jun. 15, 2015 (6 pages).
Duncan Solutions—Eagle 2100 brochure, 2013 (2 pages).
On-street Parking Automatic Toll Collector System Proposal for Jinan City dated May 2005 (41 pages).
DAT Self-service System Limited, User Manual for DAT Focus Meter, Version 1.0, Date: May 2005, pp. 1-39 (39 pages) (no translation).
Photo Violation Technologies—Revolutionizing the Industry by Perfecting How People Park, https://web.archive.org/web/20060813094459/http://photoviolation.com/, Aug. 13, 2006 (65 pages).
Photo Violation Technologies—Revolutionizing the Industry by Perfecting How People Park, https://web.archive.org/web/20060823100739/http://photoviolation.com/, Aug. 23, 2006 (68 pages).

(56) References Cited

OTHER PUBLICATIONS

Photo Violation Technologies—Revolutionizing the Industry by Perfecting How People Park, https://web.archive.org/web/20080222104246/http://photoviolation.com/, Feb. 22, 2008 (47 pages).
Photo Violation Technologies—Revolutionizing the Industry by Perfecting How People Park, https://web.archive.org/web/20060110041849/http://photoviolation.com/, Jan. 10, 2006 (57 pages).
Photo Violation Technologies—Revolutionizing the Industry by Perfecting How People Park, https://web.archive.org/web/20060715195511/http://photoviolation.com/, Jul. 15, 2006 (49 pages).
Photo Violation Technologies—Revolutionizing the Industry by Perfecting How People Park, https://web.archive.org/web/20070628195927/http://photoviolation.com/, Jun. 28, 2007 (49 pages).
Photo Violation Technologies Corp., https://web.archive.org/web/20040401225217/http://photoviolation.com/, Apr. 1, 2004 (50 pages).
Photo Violation Technologies Corp., https://web.archive.org/web/20131118213440/http://photoviolation.com/, Nov. 18, 2013 (8 pages).
YouTube video, "The PhotoViolationMeter TM" https://www.youtube.com/watch?v=YEFuebnwn_Y, Dec. 15, 2006 (2 pages).
Bridge IR Goup, Inc., Changing the Way the World Pays for On-Street Parking, Research Report, United States—Technology Processing Systems/Products, Dec. 6, 2006 (23 pages).
Barefoot, D., "There'll be lies, there'll be tears, a jury of your peers," DarrenBarefoot.com: Dec. 2005, pp. 8-9 (39 pages).
Photo Violation Technologies Corp.—Products, Oct. 2, 2015 (3 pages).
Photo Violation Technologies Corp. Press Releases, Jul. 18, 2005-Jan. 17, 2006 (9 pages).
The Patented PhotoViolationMeter Solution book view, dated Mar. 28, 2006 (12 pages).
PhotoViolationMeter pamphlet, dated Jan. 18, 2006 (2 pages).
The PhotoViolationMeter Case Study, Photo Violation Technologies Corp., Dec. 15, 2015 (4 pages).
Transcript & Screenshots of https://web.archive.org/web/20080222104246/http://www.photoviolation.com/videos/HHU.wmv, Photo Violation Technologies Corp.—"PhotoViolationHandHeldUnitTM," dated prior to Jun. 15, 2015 (7 pages).
Transcript & Screenshots of https://web.archive.org/web/20080222104246/http://www.photoviolation.com/videos/PBS.wmv, Photo Violation Technologies Corp.—"The PBS Solution," dated prior to Jun. 15, 2015 (10 pages).
Transcript & Screenshots of https://web.archive.org/web/20080222104246/http://www.photoviolation.com/videos/PVM.wmv, Photo Violation Technologies Corp.—"The PVM Solution," dated prior to Jun. 15, 2015 (17 pages).
MacKay Custodian TM Multi-Space Machine Configuration Guide, 2003-2005 (184 pages).
Reino International, Recommended Cashbox Handling Guidelines, Version 2.0, Nov. 26, 2003 (7 pages).
Digital Payment Technologies, Credit Card Processing with Luke and Shelby, Dec. 2007 (15 pages).
Duncan Solutions—Intermec CN50 webpage, Mar. 8, 2011 (2 pages).
Duncan Solutions—Motorola MC75 webpage, Mar. 8, 2011 (2 pages).
Duncan Solutions—AutoCITE brochure, 2013 (2 pages).
Duncan Solutions—AutoCITE TM X3 Handheld Computer, 2013 (2 pages).
Ambravan, B., "Improved-Clarity Polycarbonate (PC) Resins used in liniLED PU," http://organiclighting.com/tag/polycarbonate-pc-resins/, Sep. 26, 2016 (1 page).
Intrinsyc Software International, Inc., Intrinsyc and Digital Pioneer Partner on Development of New Leading Edge Parking Terminal Solution, Aug. 14, 2003 (2 pages).
Shaheen, S., "Smart Parking Management Field Test: A Bay Area Rapid Transit (BART) District Parking Demonstration," Institute of Transportation Studies, UC Davis, Jan. 1, 2005 (139 pages).
Micrel, Application Note 51 Frequency Hopping Techniques, Jun. 2006, Rev. 1.0 (8 pages).

Cardinal Tracking Inc.—MobileCite brochure, dated prior to Jun. 15, 2015 (2 pages).
The United States Conference of Mayors Press Release, "The U.S. Conference of Mayors Presents 'Best-Practice' Awards," Jan. 20, 2012 (3 pages).
Reino, Operator User Manual, 2003 (106 pages).
Remedios et al., "NFC Technologies in Mobile Phones and Emerging Applications," 2006, IFIP International Federation for Information Processing, vol. 220, Information Technology for Balanced Manufacturing Systems, ed. Shen, W., (Boston: Springer, pp. 425-434 (10 pages).
Reino, Parking Systems RSV2 Service Manual, Version 3.1, Dec. 2003 (78 pages).
Duncan Solutions, Pay-by-Space Parking Meters, Customer Support Manual, Jul. 2006 (216 pages).
Bayless et al., "Smart Parking and the Connected Consumer," ITS America Research, Dec. 2012 (39 pages).
Bernspang, F., "Smart Parking using Magnetometers and Mobile Applications," Master's Thesis, Master of Science in Engineering Technology, Computer Science and Engineering, Lulea University of Technology, Nov. 2010-May 2011 (35 pages).
Cosgrove, D., "SmartPark," Senior Project Report, Jun. 12, 2013 (20 pages).
Spyker, R. L., "Predicting capacitor run time for a battery/capacitor hybrid source," Power Electronic Drives and Energy Systems for Industrial Growth, 1998, abstract only (2 pages).
Video link, "PhotoViolationHandHeldUnit TM" https://web.archive.org/web/20080222104246/http://www.photoviolation.com/videos/HHU.wmv, Photo Violation Technologies Corp., dated prior to Jun. 15, 2015.
Video link, "The PBS Solution" https://web.archive.org/web/20080222104246/http://www.photoviolation.com/videos/PBS.wmv, Photo Violation Technologies Corp., dated prior to Jun. 15, 2015.
Video link, "The PVM Solution" https://web.archive.org/web/20080222104246/http://www.photoviolation.com/videos/PVM.wmv, Photo Violation Technologies Corp., dated prior to Jun. 15, 2015.
Video link, "Park Card Meter TM System," https://web.archive.org/web/20080222104246/http://www.photoviolation.com/videos/PCM.wmv, Photo Violation Technologies Corp., dated prior to Jun. 15, 2015.
Byrd Dennis, Parking Meter Manufacturer Sees Bright Future for New Sun-Powered Devices, Los Angeles Times, May 14, 1989 (2 pages).
AU315846—Figures.
AU315847—Figures.
AU315845—Figures.
AU314132—Figures.
The United States Conference of Mayors Pres Release, "The U.S. Conference of Mayors Presents 'Best-Practice Awards'", Jan. 20, 2012 (3 pgs).
Duncan Solutions, Single-Space Meters Brochure, www.duncansolutions.com, 2006 (2 pgs).
Kienzle, meter photograph, pre-Mar. 2011.
Duncan Solutions, AutoTrax Meter Management System Brochure, May 2010 (2 pgs).
Barefoot, D., "There'll be lies, there'll be tears, a jury of your peers", DarrenBarefoot.com, Dec. 2005, pp. 8-9(39 pgs).
Duncan Solutions, AutoCite X3 Handheld Computer brochure , 2013 (2 pgs).
Schuering, K., "Weatherable PC Applications Expand", www.plasticstoday.com, Sep. 26, 2016 (2 pgs).
Jim Bonfield, An Exerise in Changing the Business: Advertising Vending Machines dated Feb. 7, 2008 (4 pgs.).
Meter Solutions, Single-Space Meters brochure, downloaded from www. Duncansolutions.com website, revised Apr. 2006.
PhotoViolationMeter pamphlet ((undated) 2 pages).
StreetSmart Technology, LLC, "Technical Specifications and System Features of the StreetSmart Solution" Brochure dated May 2011.
No_change_for_car_park_charge_Just_RingGo_July_6_2017.
Parking_Pay_Stations_Cocoa_Beach_FL_Official_Website.

(56) References Cited

OTHER PUBLICATIONS

EBAY_listing_AMANO_MCGANN_MSM_METRIC_ELITE_LS_SOLAR_2022.
Nebraska_Innovation_Campus_Additional_way_to_pay_metered_street_parking_at_NIC_2022.
IPS_Group_Inc._Vehicle_Detection_Sensors_6_pgs_webpage.
The_Klinghardt_Brain_Solutions_Protocol_Klinghardtinstitute.com_2_pgs.
SEDADI_Card_and_Coin_Meter_Lease_City_of_LA_Nov_29_2010_4pgs.
ALIBABA_com_Ticket_Dispenser_Parking_Management_System_Auto_Pay_Station_Product_12_pgs.pdf.
IPS_Group_com_M5_Single_Space_Smart_Meter_2022_2_pgs.pdf.
IPS_Group_com_Vehicle_Detection_Stereoscopic_Smart_Sensors_2022_2_pgs.pdf.
Made_In_China_com_Pay_Station_for_Payment_Parking_Meter_with_Solar_3_pgs.
PAR_KUT_com_Pay_Station_Shelters_3_pgs.
GARRA_et_al_A_Privacy_Preserving_Pay_by_Phone_Parking_System_2017_10pgs.
R_Maitra_Payphones_Parking_Meters_Vending_Machines_Feb_2001.

\* cited by examiner

PARKING METER HAVING TOUCHSCREEN DISPLAY

RELATED APPLICATIONS

The current application is a Continuation In Part of U.S. patent application Ser. No. 16/774,099 filed Jan. 28, 2020, which claims priority to Canadian patent application 3,031,936 filed Jan. 30, 2019, both of which are incorporated herein by reference in their entirety for all purposes.

TECHNICAL FIELD

The current disclosure relates to parking meters and in particular to parking meters incorporating touchscreens.

BACKGROUND

Parking meters can be classified as either a multi-space meter or a single space meter. Multi-space meters are generally larger and are used to manage payment for park time at a large group of parking spaces such as a parking lot or street block. Multi space meters tend to have sufficient space to include larger cash vaults, large batteries as well as large solar panels. Alternatively, Multi-space meters may be connected to an electrical grid. Single space meters are generally smaller meters, typically found at on street parking spots. Single space parking meters tend to be significantly smaller than multi space meters and as such may have limited space for cash vaults, batteries and solar panels. Although referred to as single space meters, they are capable of monitoring additional parking spaces. For example, it is common to provide a single space parking meter to monitor two parking spaces.

Alphanumeric keypads have been provided in multi space parking meters. However due at least in part to space restrictions they have not been used in single space parking meters.

BRIEF DESCRIPTION OF THE DRAWINGS

Features, aspects and advantages of the present disclosure will become better understood with regard to the following description and accompanying drawings in which.

DETAILED DESCRIPTION

Figure 1:
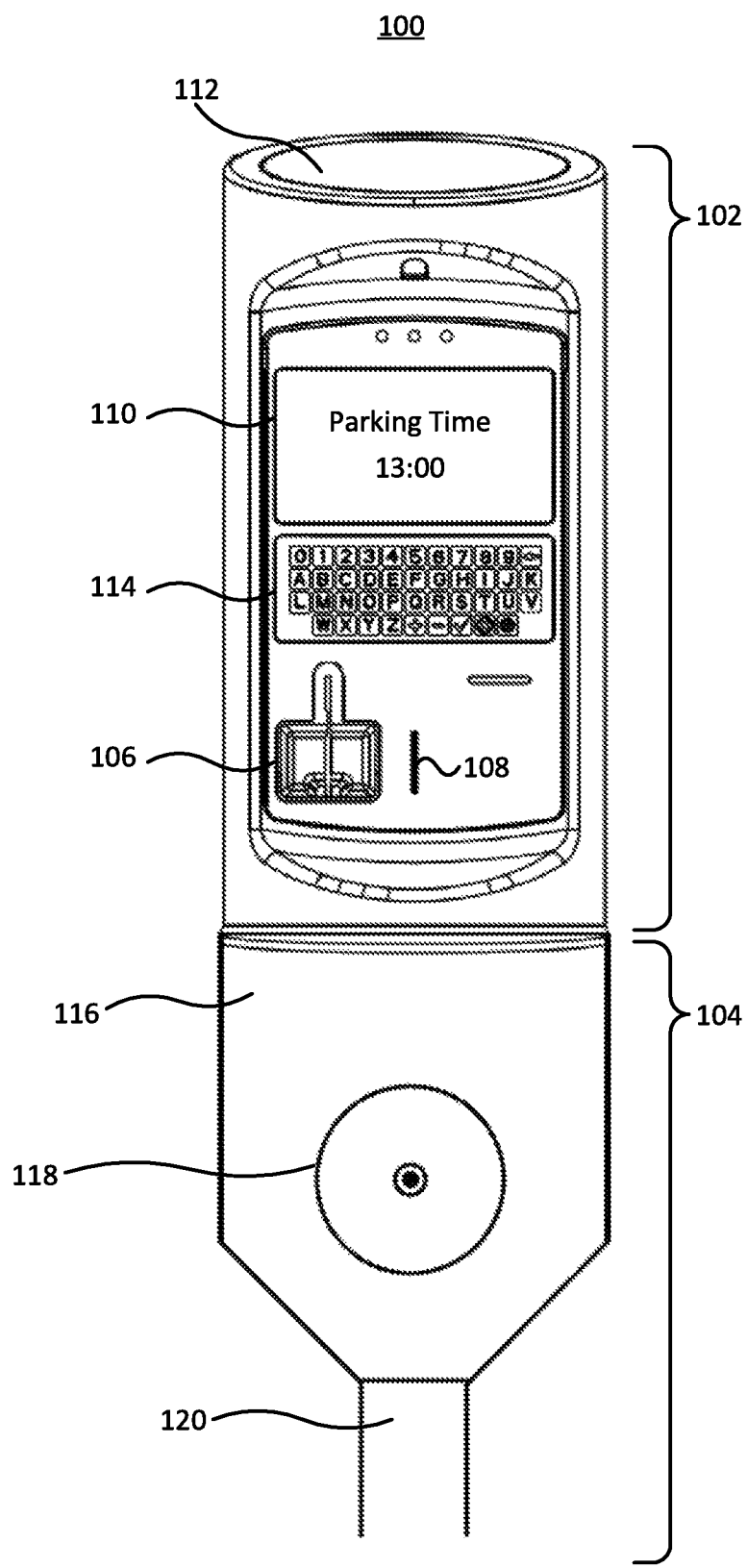
FIG. 1 depicts a single space parking meter incorporating an SPI keyboard module.

In accordance with the present disclosure there is provided a parking meter comprising: a meter housing; metering components within the meter housing, the metering components including a touchscreen assembly comprising: a display; a touch sensor overlaid on the display; and a low-power wake trigger.

In a further embodiment of the parking meter, the metering components comprise at least one controller configured to turn on the display of the touchscreen assembly when the low-power wake trigger provides a wake signal.

In a further embodiment of the parking meter, the low-power wake trigger comprises a secondary touch sensor overlaid on the touch sensor, wherein the secondary touch sensor is capable of providing an indication that a touch occurred without providing coordinates of the touch.

In a further embodiment of the parking meter, the metering components comprise at least one controller configured to turn on the display of the touchscreen assembly when a user's proximity is detected by the proximity sensor and turn off the display of the touchscreen assembly after an inactivity period of time.

In a further embodiment of the parking meter, the at least one controller is further configured to turn on the touch sensor when the display is turned on and turn off the touch sensor when the display is turned off.

In a further embodiment of the parking meter, the metering components further comprise a solar panel attached at a first location of the parking meter.

In a further embodiment of the parking meter, the metering components further comprise an additional solar panel attached at a second location of the parking meter.

In a further embodiment of the parking meter, the metering components further comprise a solar panel controller for controlling operation of the solar panel and additional solar panel.

In a further embodiment of the parking meter, the solar panel controller independently controls the solar panel and additional solar panel.

In a further embodiment of the parking meter, the solar panel controller controls the solar panel and additional solar panel using maximum power point tracking functionality.

In accordance with the present disclosure there is provided a parking meter comprising: metering components; an insert housing comprising one or more openings for receiving respective user interface components; an external housing component enclosing the metering components, the external housing component comprising: at least one opening for a payment device; and at least one cutout for receiving the insert housing, wherein the insert is secured within the cutout of the external housing component.

In a further embodiment of the parking meter, the parking meter is a multi-space parking meter and the external housing component comprises a door panel of a cabinet of the multi-space parking meter.

In a further embodiment of the parking meter, the insert comprises a plurality of openings including a first opening for a display and a second opening for a keyboard or keypad, wherein the metering components include the display and keyboard or keypad.

In a further embodiment of the parking meter, the insert comprises a single opening for a touchscreen display, wherein the metering components include the touchscreen display.

In a further embodiment of the parking meter, the touchscreen display is part of a touchscreen display assembly comprising the touch screen display and a proximity sensor, wherein the proximity sensor turns on the touchscreen display when a user's proximity is detected.

In a further embodiment of the parking meter, the insert is secured within the cutout by bolts secured to an inside of the external housing.

In a further embodiment of the parking meter, the parking meter is a single space parking meter.

In accordance with the present disclosure there is further provided an SPI touch screen module for connection to a parking meter controller in a parking meter by an SPI bus, the SPI touch screen module comprising: a touch screen display; a touch sensor overlaid on the touch screen; a display controller configured to: receive display information from the parking meter controller; and display at least one virtual key on the touch screen display according to the received display information; and at least one keyboard controller configured to: detect a touch at a location on the touch sensor; and transmit over the SPI bus an indication of the location on the touch sensor of the detected touch to the keyboard interface of the parking meter controller.

Single space parking meters and multi space parking meters can be used by different companies, cities, governments, etc., referred to as operators for brevity, for monitoring parking spaces. Different operators may have different requirements for their parking meters and as such parking meter designs are often modified to suit the different needs of the different operators. A parking meter keyboard module is described further below that provides flexibility in using different keyboard layouts. Different keyboard modules can be used without requiring significant changes to the underlying parking meter control. The keyboard modules also can provide low power consumption making them well suited for use in single space parking meters.

FIG. 1 depicts a single space parking meter incorporating an SPI keyboard module. The parking meter 100 has an upper portion 102 that is secured to a lower portion 104. The upper portion houses the main components of the parking meter 100. While the particular components may vary from meter to meter they may include a payment means such as a card reader 106 for reading payment cards as well as a coin slot 108 for accepting coins. The parking meter includes a display 110 for displaying information such as instructions, parking time purchased, time remaining etc. A solar panel 112 may be positioned on the parking meter 100 and may provide power to the parking meter to charge a battery in order to extend an operating life of the parking meter. In addition to the payment means, display and solar panel, the parking meter includes a keyboard 114. As depicted in FIG. 1, the keyboard 114 may be an alphanumeric keyboard including all of the letters 'A' to 'Z', the number 0 to 9 as well as additional keys such as a plus key, a minus key, an 'OK' key, a cancel key and a language key. As described in further detail below, the keyboard 114 is provided by a serial peripheral interface (SPI) keyboard module. The SPI keyboard module allows different keyboard layouts to be used without requiring further changes to the parking meter components. An SPI keyboard interface provided by, for example, the main parking meter controller is able to communicate with different SPI keyboard modules regardless of the keyboard layouts, and determine keys that have been pressed. In addition to providing easy flexibility for using different keyboard layouts, the SPI keyboard module can provide low power consumption, making it well suited for use in single space parking meters that may have limited space for batteries.

The keyboard 114 allows a user to input various information into the parking meter 100. For example, the keyboard 114 may be used to provide pay-by-space functionality or pay-by-plate functionality, both of which are common to multi-space meters. Pay-by-space functionality allows a user to pay for a particular parking spot that is associated with an identifying number by entering the number into the parking meter and purchasing the desired amount of time. Pay-by-plate functionality allows a user to purchase parking time that is associated with a license plate or vehicle identification number (VIN) by entering the license plate or last few digits of the VIN into the parking meter and purchasing the desired amount of parking time. Additional functionality may be provided that makes use of the keyboard 114. For example, a user could enter a telephone number in order to receive notifications of expiry of the purchased parking time or an e-mail address to receive a payment receipt.

The upper portion of the parking meter 102 is secured to the lower portion 104. The lower portion comprises a vault 116 for coins inserted into the coin slot 108. The vault 116 may have a vault door 118 for removal of the collected coins. The vault 116 can be secured to a post 120 or other structure that secures the parking meter 100 in a desired location.

Figure 2A:
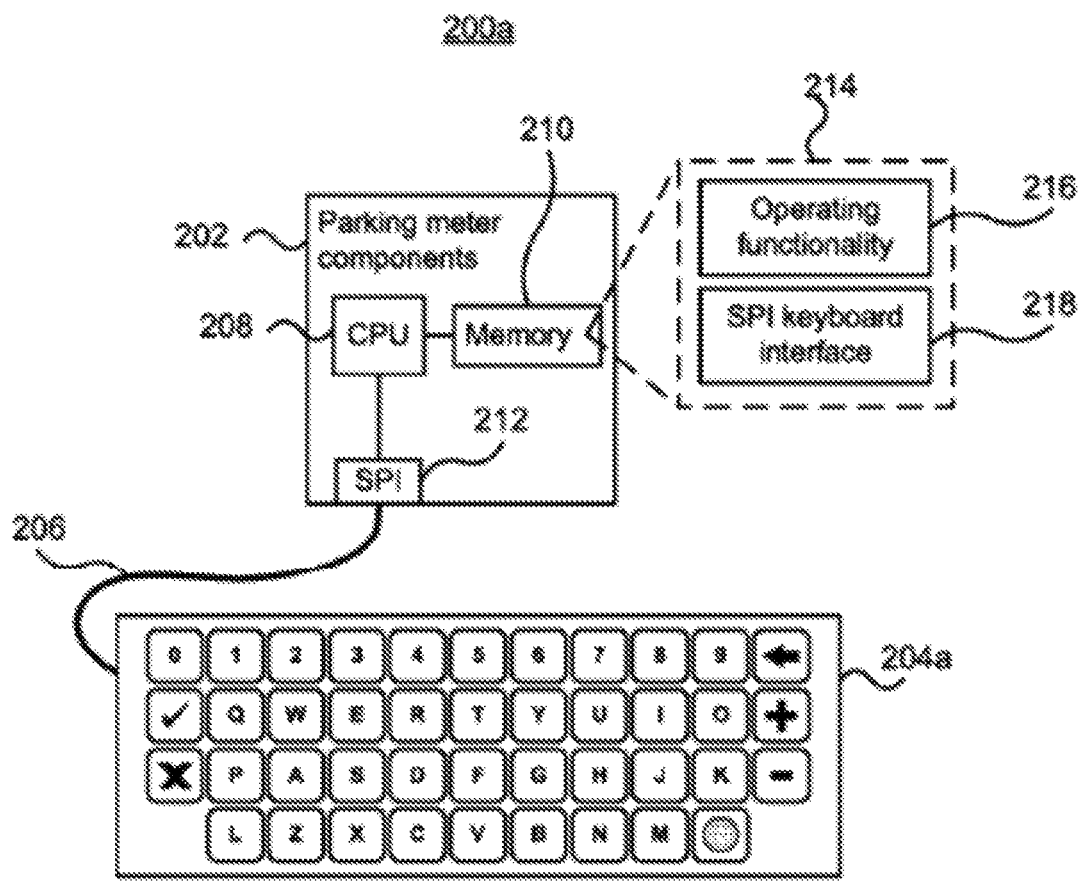
FIG. 2A depicts parking meter components and an alphanumeric SPI keyboard module.

FIG. 2A depicts parking meter components and an alphanumeric SPI keyboard module. The parking meter 200a comprises main parking meter components 202, an SPI keyboard module 204a connected to the parking meter components by an SPI bus 206. The main parking meter components include at least one processor or controller, depicted as CPU 208, that executes instructions stored in memory 210. The parking meter components may further include a physical connection 212 to the SPI bus. When the instructions stored in the memory 210 are executed, they configure the parking meter components 202 order to provide various functionality 214 to the parking meter. The functionality 214 includes operating functionality 216, which broadly provides the parking meter functions, for example the timing functionality, purchasing functionality, communication functionality, etc. It will be appreciated that the operating functionality may include a wide variety of different functionality which is not described in detail. Regardless of the particular operating functionality, it is necessary to provide user input to the operating functionality, for example in order to allow a user to specify a desired amount of time to purchase. The user input may include further input for example to control, review, or set operating parameters of the parking meter.

The functionality 114 further includes SPI keyboard interface functionality 218 that communicates with the SPI keyboard module 204a over the SPI bus 206. The SPI keyboard interface functionality 218 receives an indicator of a particular key that was pressed and maps the indicator to a key which is communicated to the operating functionality 216. For example, the SPI keyboard interface functionality 218 may receive an indicator of '15' over the SPI bus 206 indicating that key number 15 was pressed. The SPI keyboard interface functionality 218 maps the received indicator to a key of the keyboard, for example '15' may be mapped to a key 'e'. The particular mapping used by the SPI keyboard interface 218 for mapping an indicator to a key may change depending upon the keyboard used.

Figure 2B:
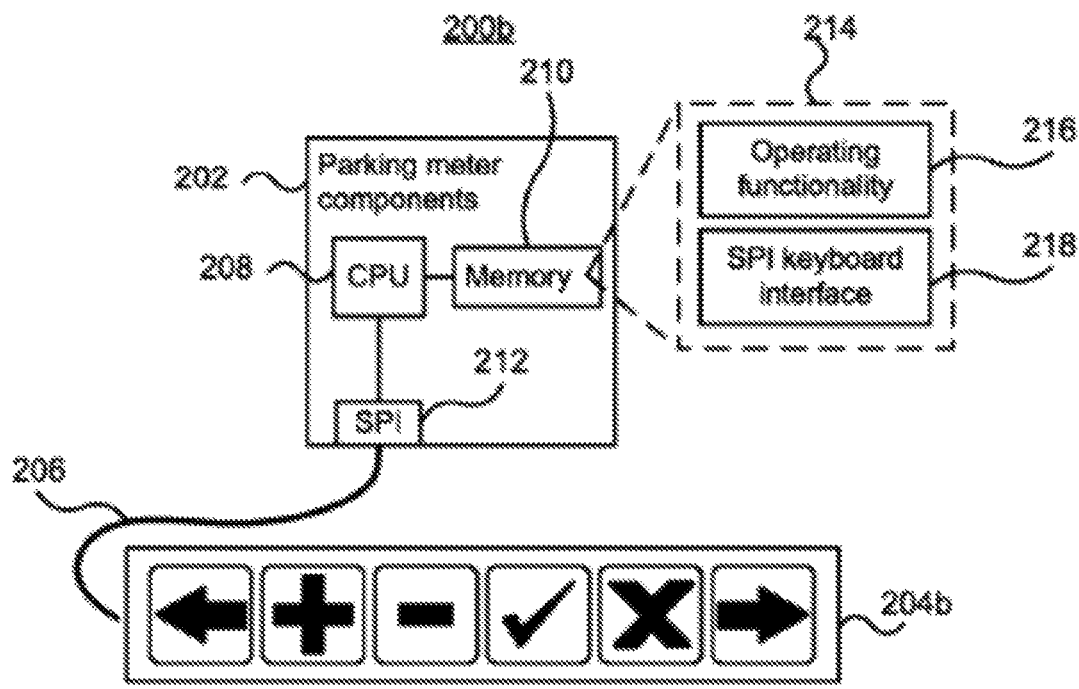
FIG. 2B depicts parking meter components and a 6-key SPI keyboard module.

FIG. 2B depicts parking meter components and a 6-key SPI keyboard module. The parking meter 200b is substantially the same as parking meter 200a except that a different SPI keyboard module 204b is connected to the SPI bus 206. The SPI keyboard module 204b layout is significantly different from that of the alphanumeric SPI keyboard module 204a and comprises 6 keys. Although the SPI keyboard module 204b has a significantly different layout from that depicted in FIG. 2A, the parking meter components 202 and in particular the operating functionality 216 and the SPI keyboard interface functionality 218 remains the same as described above for parking meter 200a. In order to operate correctly with the different keyboard layout depicted in FIG. 2B, the mapping used by the SPI keyboard interface 218 to map a received indicator to a key is selected for the particular keyboard. The mapping may be loaded into the SPI keyboard interface functionality during a manufacturing stage, an assembly stage, a setup or configuration stage or during an in-use stage while the parking meter is installed in the field. The mapping may be loaded manually at the meter by a technician, or the mapping may be loaded automatically based on the particular SPI keyboard module connected to the parking meter components. Additionally or alternatively, the meter may have the ability to establish a communication channel with a remote management server or a mobile data source to automatically request and download the correct mapping data corresponding to the connected SPI keypad from that remote management server or mobile data source. The SPI keyboard interface functionality 218 allows different keyboard layouts to be used with minimal changes, if any, to the operating functionality, as well as minimizing manual intervention at the meter by a technician.

The above has described an SPI keyboard module that provides flexibility in laying out the physical keys of the keyboard. As described further below, rather than using physical keys, a virtual keyboard may be provided in a similar manner by an SPI touch screen module.

Figure 3:
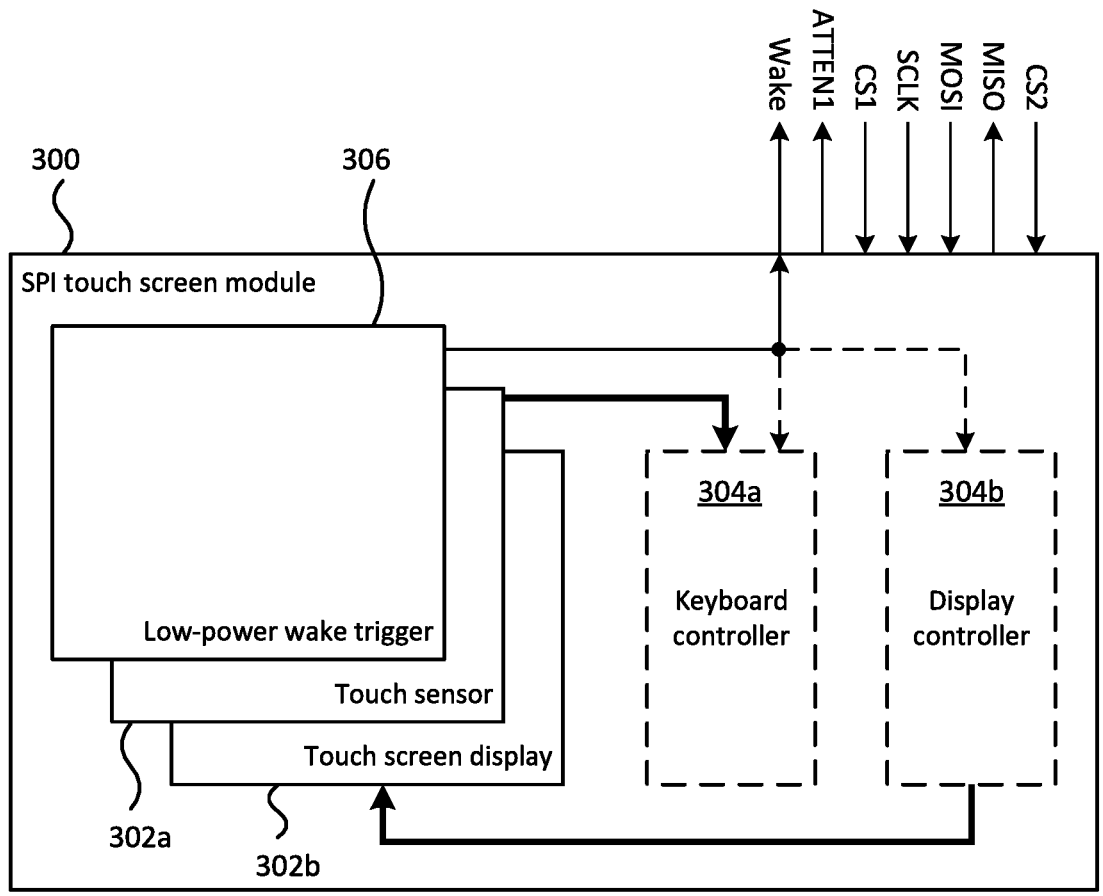
FIG. 3 depicts an SPI touch screen module.

FIG. 3 depicts an SPI touch screen module. An alternative low power SPI implementation of a virtual keyboard may be implemented using a touch screen over a display screen. Touch screen technology is quite common, and virtual keyboards can be created with a touch screen overlaid onto the display with visual "keys" placed at specific locations on the display. However in low power applications such as battery powered parking meters, having both the display and the touch screen technology always active consumes a lot of power and is not practical. Some solutions to this incorporate a single "wake up" button adjacent to the screen that allows the touch screen to be turned on. While the adjacent switch or button provide an effective solution for conserving power, the additional requirement of having to press the adjacent button to power on the touch screen provides a less-than desirable user experience.

The SPI touch screen module 300 comprises a touch sensor 302a overlaying a touch screen display 302. The touch sensor 302 may provide input to a keyboard controller 304a and the touch screen display 302b may be controlled by a display controller 304b. Both the keyboard controller 304a and display controller 304b may communicate with a parking meter controller (not shown) over an SPI bus interface. As depicted, the SPI bus interface may include different chip select lines, CS1 and CS2, for the keyboard controller and the display controller. Alternatively, a single CS line may be provided with the keyboard controller data being provided to the parking meter over the MISO line while the display controller receives display information, such as what to display, from the parking meter controller over the MOSI line.

In addition to touch sensor 302a and the touch screen display 302b, the SPI touch screen module may further include a low-power wake trigger 306. The low-power wake trigger 306 may be provided by for example as a secondary touch sensor overlaid on top of the touch sensor and the touch screen. The secondary touch sensor may only be required to provide an indication of whether a touch occurred, rather than also providing an indication of the coordinates of one or more touches. The low-power wake trigger 306 can provide a wake signal to the parking meter controller (not shown) providing an indication that the touch screen display of the SPI touch screen module should be powered on or woken up. Additionally or alternatively, the wake signal may be provided to one or both of the keyboard controller 304a and display controller 304b.

Although depicted as an overlay on top of the touch sensor and touch screen display, the low-power wake trigger 306 may be provided in other ways. For example a vibration sensor may be attached to the touch sensor and/or touch screen display to allow detection of vibrations caused by a user pressing or tapping on the screen. Additionally or alternatively, a piezo electric element or switch may be physically associated with the touch screen to detect an initial press on the touch screen. By incorporating an additional touch or vibration sensitive technology into the traditional touch screen solution, an initial finger press or touch anywhere on the touch screen display of the SPI touch screen module can be used as an initial wake up mechanism. Upon waking up, the touch screen display with touch sensor may become active. The combination of the touch screen with the low power wake trigger associated with the touch screen, conserves power as it allows the initial lower power touch or vibration sensor to trigger the system to wake up or provide an interrupt, which allows the higher powered virtual keyboard utilizing a touch sensor and touch screen display to become active and available to use.

Figure 4:
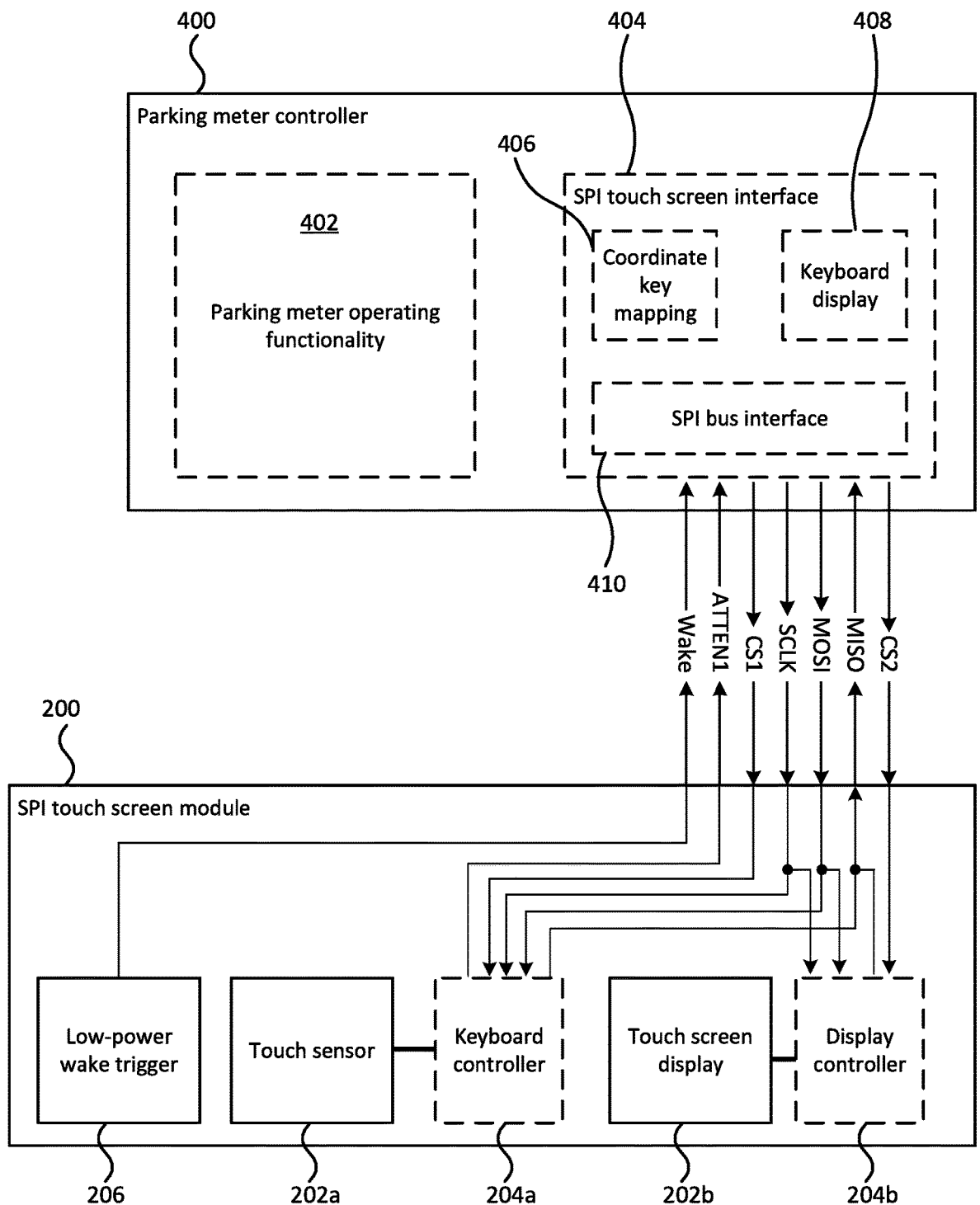
FIG. 4 depicts parking meter components of a further parking meter incorporating the SPI touch screen module of FIG. 3.

FIG. 4 depicts parking meter components of a further parking meter incorporating the SPI touch screen module of FIG. 3. The SPI touch sensor module 300 is depicted as being connected to the parking meter controller 400 via an SPI bus interface that includes the shared Serial Clock (SCLK) line, Maser Out Slave In (MOSI) line, and Master In Slave Out (MISO) line. The SPI bus interface is depicted as further including respective chip select (CS1, CS2) lines for the keyboard controller and display controller respectively, an attention (ATTEN1) line providing an indication that a key press, or rather a touch screen press, is ready to be transmitted, and a wake (Wake) line providing an indication to the parking meter controller 400 that the touch screen display has been touched or pressed.

The parking meter controller 400 may comprise parking meter operating functionality 402 as well as SPI touch screen interface functionality 404. The SPI touch screen interface functionality 404 is similar to the SPI keyboard interface functionality described above. While the SPI keyboard interface functionality maps a key switch that was pressed to a corresponding key using a particular key map associated with the particular SPI keyboard module, the SPI keyboard interface functionality maps a screen location that was pressed to a corresponding key using a coordinate key mapping 406 associated with the particular screen displayed on the touch screen display 302. The SPI touch screen interface functionality may include keyboard display functionality 408 that may interact with the parking meter operating functionality 402 in order to display, or more particularly cause the SPI touch sensor module to display, an appropriate virtual keyboard screen, or other appropriate or desired screen. Information about the location of displayed keys may be provided to both the keyboard display functionality 408 and the coordinate key mapping functionality 406 in order to map a press on the touch sensor to a particular key displayed at the pressed location. The indication of the pressed location as well as the display information may be transmitted between the SPI touch sensor module 300 and the parking meter controller 400 over the SPI bus interface. As described above, a wake signal may be provided to the parking meter controller from the low power wake trigger 306 on the SPI touch sensor module. The wake signal may also be provided to the display controller 304b and possibly the keyboard controller 304a. Upon receiving the wake signal from low-power wake trigger 306, the parking meter controller 400 determine what should be displayed on the touch screen display 302b and transmit the appropriate data to the SPI touch sensor module to 300 using the SPI bus interface functionality 406 to cause the SPI touch sensor module to display the screen on the touch screen display.

The touch sensor 302a and keyboard controller 304a of the SPI touch sensor module 300 may send an indication of a pressed location on the touch sensor 302a overlaying the touch screen display in a similar manner that the keyboard controller of the SPI keyboard module described above sends an indication of the pressed key switch to the parking meter controller. In particular, the keyboard controller may set the signal on the ATTEN1 signal line to indicate to the parking meter controller that touch data is available for transmission. When the CS1 line signal is set, the location information indicating the location of the press or touch on the screen may be transmitted over the MISO signal line.

The SPI touch screen module described above provides a touch screen keyboard connected to the parking meter controller via an SPI interface which may behave substantially as a keyboard. The SPI touch screen keyboard may also include a low-power wake trigger that provides a wake signal that may be used to wake of the meter, including powering on the display of the touch screen keyboard. As described further below, a parking meter may use a touch screen display for both the user interface display as well as providing a virtual, or touch, keyboard.

It may be desirable to incorporate a touchscreen display into a parking meter, however the power requirements for a large display may be relatively large for use in a parking meter that is powered by batteries and/or solar panels. In order to reduce the power requirements of the touchscreen display, a wake trigger may be used to turn the display on when a user is detected, for example based on a detected touch or user's proximity. The touch screen display may provide the parking meter with a graphical user interface, allowing other user interface components, such as other keypads, keyboards, and/or buttons to be eliminated from the parking meter. Accordingly, the touchscreen display may be used to provide a parking meter having a smaller footprint. Additionally or alternatively, the eliminated interface components may provide space for additional components such as additional solar panels for powering the meters. Further, the touchscreen display may provide a flexible graphical user interface allowing the same parking meter to provide various different parking meter functionality, such as pay and display functionality, pay by space functionality, and/or pay by plate functionality. While touchscreen displays may be desirable in certain applications, it may also be desirable to provide a parking meter that is initially provided with a non-touchscreen user interface that can be easily upgraded or retrofitted with a touchscreen display, an alternative display or other user interfaces.

Figure 5:
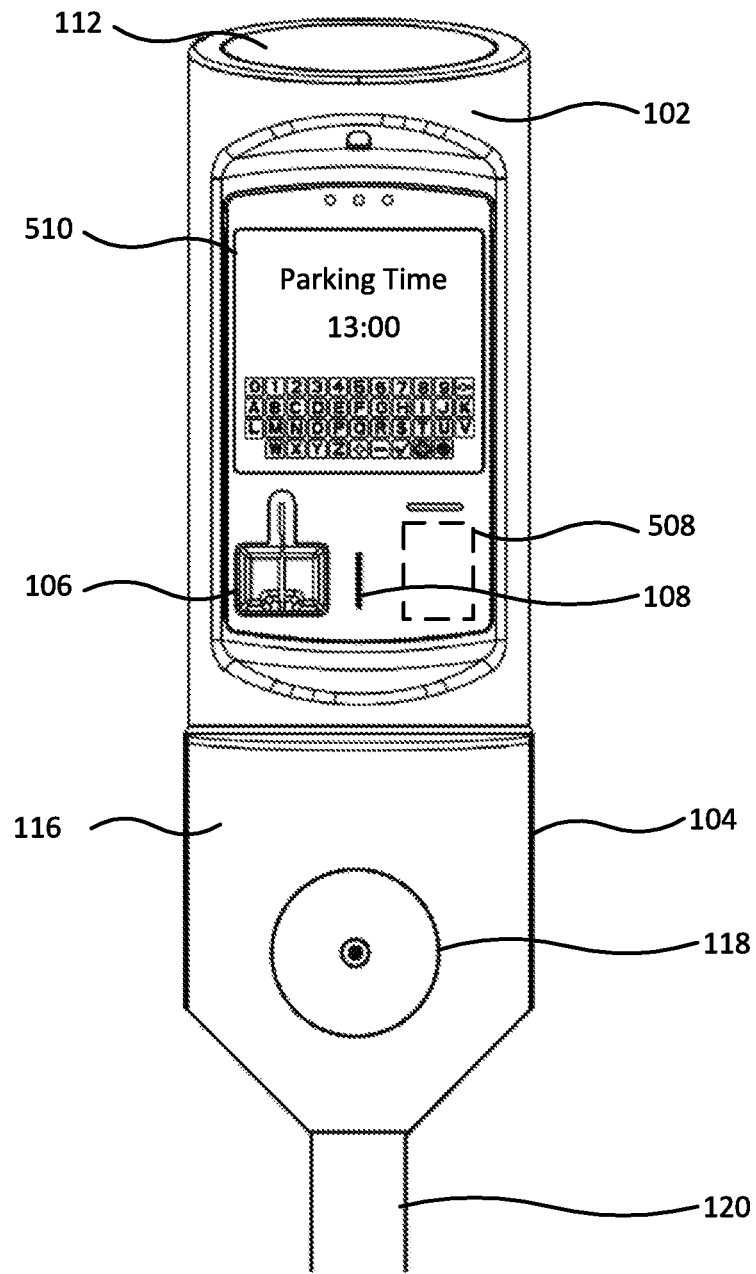
FIG. 5 depicts a parking meter incorporating a touchscreen display assembly.

FIG. 5 depicts a parking meter incorporating a touchscreen display assembly. The parking meter 500 is similar to the parking meter 100 described above, however rather than incorporating an SPI touchscreen keyboard module and a separate display, the parking meter 500 uses a touchscreen display assembly. Similar to the parking meter 100, the parking meter 500 has an upper portion 102 that is secured to a lower portion 104. The upper portion houses the main components of the parking meter 100. While the particular components may vary from meter to meter they may include a payment means such as a card reader 106 for reading payment cards as well as a coin slot 108 for accepting coins as well as a tap or NFC sensor 508 for contactless payment readers, as well as a solar panel 112. The parking meter 500 incorporates a single large touchscreen display 510 that provides a user interface for both displaying information to the user as well as receiving input from the user. In order to provide an energy efficient display, the touchscreen 510 may incorporate a low-power wake trigger similar to that described above with regard to the SPI touchscreen keyboard. Further, as described further below with reference to FIG. 7, the low-power wake trigger may be provided by a proximity sensor that is capable of sensing the proximity of a user to the touchscreen display 510. In order to conserve energy, the meter 500 may power off, or place into a low power mode, the display and the touch sensor of the touchscreen, after a period of inactivity has occurred. The meter may continue to operate the low-power wake trigger or proximity sensor in order to detect a user interaction with the meter and power on, or place into a wake mode, the display and touch sensor as well as other components of the parking meter.

The upper portion 102 may be secured to a low portion 104 that includes a coin vault 116 with a lockable vault door 118 that can be secured to a post 120 or other structure at a parking meter location. The coin vault may be removed if it is not required to accept coin payments. Although described as being a single space meter, the meter 500 may be configured to meter multiple parking spaces. In general, multi-space meters have a larger coin vault compared to single space parking meters, however if coins are not required or if the number of coins required to be handled is low, the coin vault 116 of the single space parking meter may be sufficient to handle to metering of multiple spaces typically handled by a multi-space style meter. Multi-space meters may also incorporate a printer in order to provide pay-and-display metering functionality. However, with the touchscreen display 510 capable of providing an alphanumeric interface, the single space style meter 500 may provide a pay-by-space or pay-by-plate meter capable of metering multiple spaces.

Figure 6:
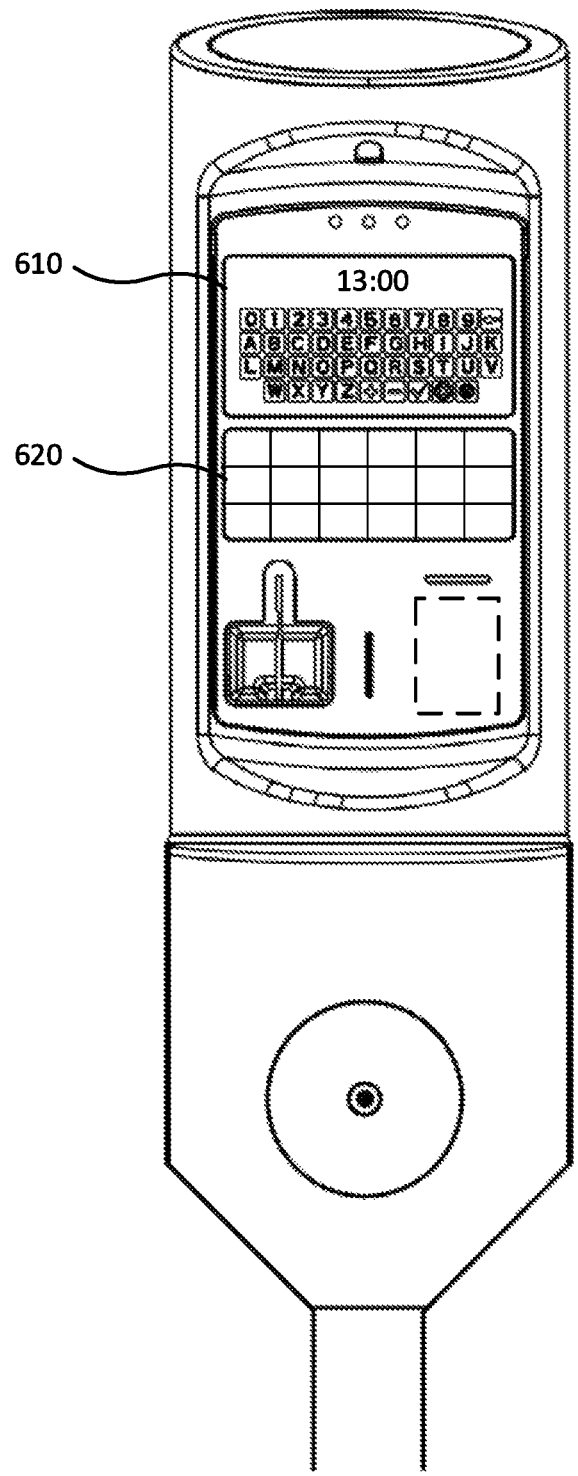
FIG. 6 depicts a parking meter incorporating a touchscreen display assembly and an additional solar panel.

FIG. 6 depicts a parking meter incorporating a touchscreen display assembly and an additional solar panel. The parking meter 600 is similar to the parking meter 500 described above that incorporates a large touchscreen display 510. Incorporating a touchscreen display into the parking meter may provide flexibility in the user interface. As depicted, the parking meter 600 may incorporate a smaller touchscreen display 610 compared to the touchscreen display 510. Incorporating a smaller touchscreen display 610 may provide more space on the exterior of the parking meter, which may allow additional components to be included in the parking meter. For example, as depicted the parking meter unit which may be secured to the coin vault or post, may incorporate an additional solar panel 620. While parking meters have previously incorporated solar panels, the solar panels have typically been located at a single location on the parking meter. As depicted in FIG. 6, multiple solar panel locations may be provided in a single space removable parking meter unit. Single space parking meters may be installed in a wide variety of locations and orientations, some of which may have a single solar panel location shaded and as such provided reduced power output. Accordingly, having multiple locations of solar panels may result in improved power output across different installation locations. The additional solar panels may be located in various different locations on the parking meter. Additionally, as described further below with reference to FIG. 10, the multiple solar panels may be independently controllable so that each individual solar panel may operate at its optimal operating parameters.

Although described above as using additional space for a solar panel 620, it is possible to incorporate other parking meter components into the parking meter with a touchscreen display. For example a printer, which may be used for pay-and-display style metering, could be incorporated into the parking meter.

Figure 7:
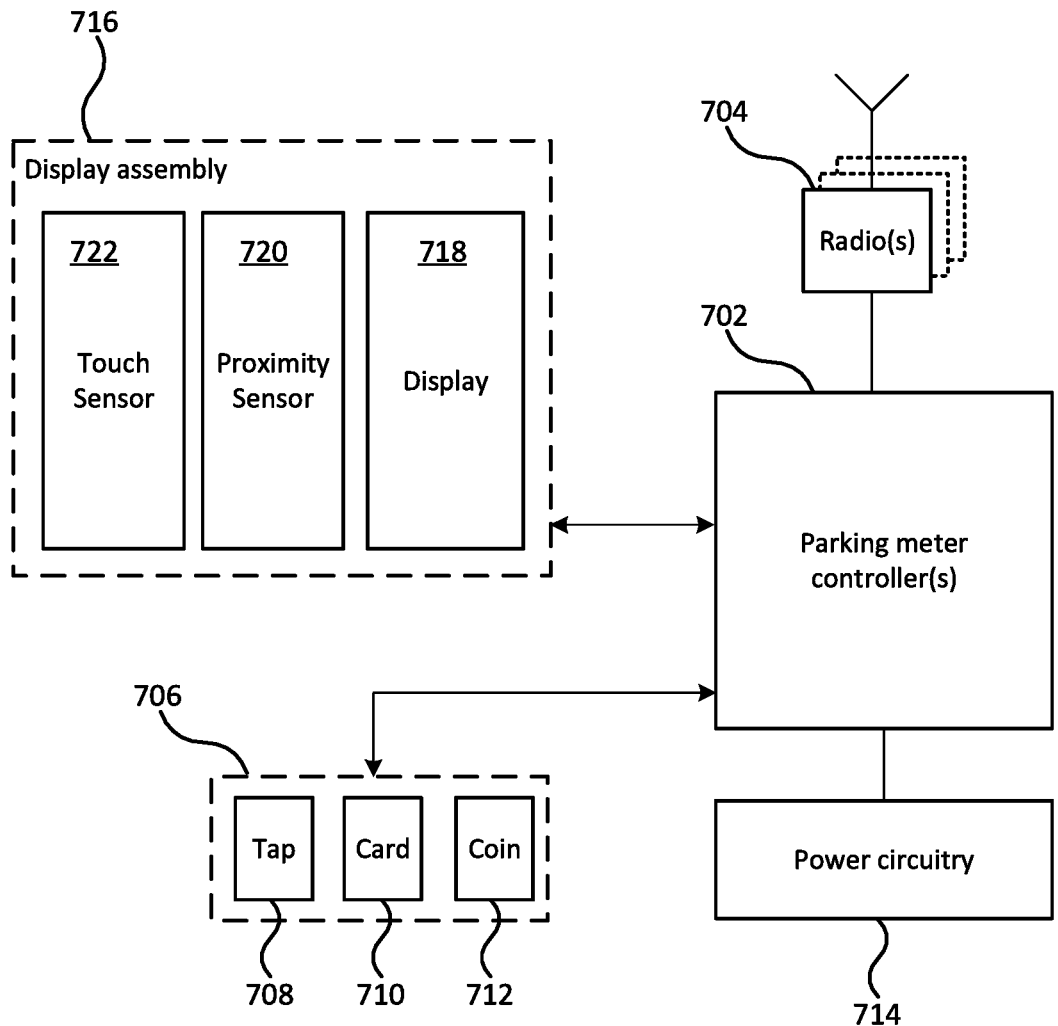
FIG. 7 depicts components of parking meter incorporating a touchscreen display assembly.

FIG. 7 depicts components of parking meter incorporating a touchscreen display assembly. The parking meter components 700 may provide a parking meter as described above with reference to FIG. 5 or FIG. 6. The components 700 may include one or more parking meter controller(s) 702. The parking meter controller(s) may be one or more of, for example, microcontrollers, microprocessors, central processing units (CPU), application specific integrated circuits (ASIC), field programmable gate arrays (FPGA) or other types of controllers. The controller(s) 702 may provide various functionality for the parking meter, including controlling the user interface, metering functionality, payment information, remote communications, power control, etc. When multiple controllers 702 are used, the controllers may communicate with each other using one or more interfaces such as SPI, I2C, USB™ HDMI™, or other types of interfaces. The components 700 may further include one or more radio(s) 704 including for example, WiFi™ radios, cellular radios, Bluetooth™, etc. The radios may be used to communicate with external devices, which may include other parking meters, external sensors such as parking spot occupation sensors, in-car payment devices, mobile phones, remote servers, etc. The radios 704 may be used to provide various features such as remote reporting and monitoring of parking meters as well as remote payment for parking.

The components 700 may further include one or more payment devices 706. The payment devices 706 map include for example one or more of a tap or contactless payment reader 708, a payment card reader 710 and/or a coin chute 712. Other payment may be possible such as paying over Bluetooth or cellular connections. The components 700 may further include power circuitry 714 used for powering the meter components 700. The power circuitry will depend upon how the meter is powered, such as by a mains connection, battery powered, and/or solar panels.

The components 700 further include a touchscreen display assembly 716. The display assembly 716 may comprise a display 718 which may be provided using various different technologies, a proximity sensor 720 that can detect a proximity of a user or user's finger to the display assembly, and a touch sensor 722 that can determine a coordinate of a user's touch. The proximity sensor 720 may use, for example, a low frequency, low power electrical near-field (E-Field) sensing components and control components to detect the approach and presence of a user or a user's hand/finger(s). The proximity sensor 720 and touch sensor 722 may be overlaid over the display to provide the touch screen assembly 716. The display assembly 716 may include one or more controllers of the parking meter controllers which may power down the display and touch sensor after a period of inactivity has passed and then turn the display and the touch sensor on when proximity of a user is detected by the proximity sensor 720. Other parking meter components of the parking meter may also be powered down, or placed in a low power mode according to inactivity of the meter and powered up or placed in a high power mode based on detected proximity by the proximity sensor 720.

Figure 8:
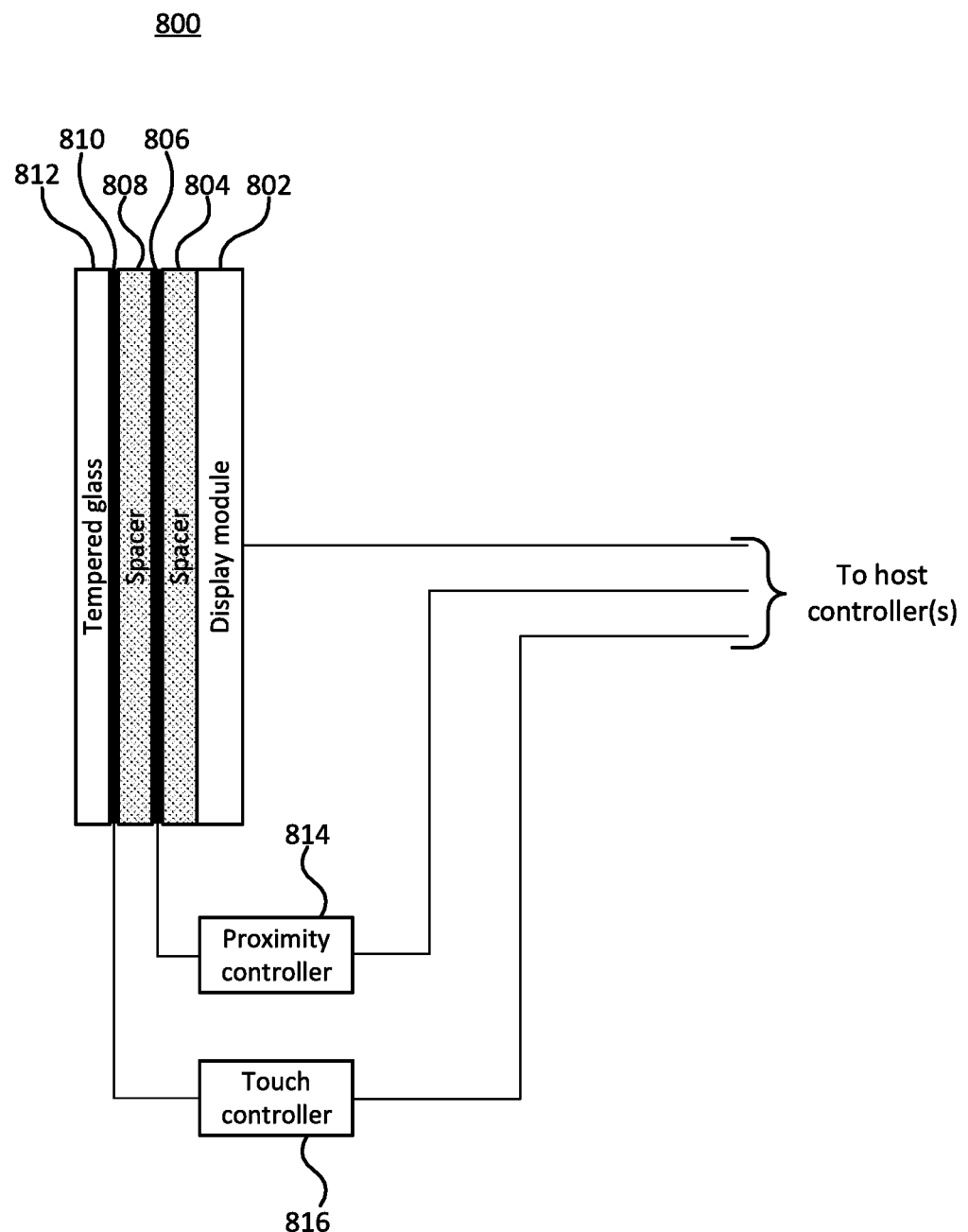
FIG. 8 depicts components of a touchscreen display assembly.

FIG. 8 depicts components of a touchscreen display assembly. The display assembly 800 may be used as the touchscreen display assembly 716. The display assembly 800 comprises a display module 802 which may be for example a monochrome or color display using various display technologies, including for example an LCD panel, LED panel, OLED panel, e-ink panel, or other possible technologies. The display module 802 may include the display panel as well as interface circuitry for connecting the display module to the parking meter controller(s). A spacer material 804, which may be a plastic or glass material or other non-conductive transparent material may be sandwiched between the display module and an electrode, or electrodes 806 of the proximity sensor. The touch sensor electrode(s) 810 and proximity electrode(s) 806 may be provided as one or more layers of thin conductive traces and/or by a transparent conductive material with the conductive layers separated by a thin layer of insulating material. The electrode(s) 806, 810 may be transparent, or near transparent so that they can be overlaid directly over the display without significantly impacting the visibility of the display. An additional spacer material 808, which may be the same or different from the spacer material 804, is sandwiched between the proximity electrode(s) 806 and electrode(s) 810 for the touch sensor. The electrodes may depend upon the technology of the touch sensor. For example, if the touch sensor uses projected capacitance the electrode(s) may comprise a pair of orthogonal matrices of conductive electrodes. The touch sensor electrodes 810 may be covered by tempered glass 812. The tempered glass 812 may provide protection to the display assembly 800 from the external environment as well as from vandalism. The touchscreen display assembly 800 may also include a proximity controller 814 and a touch controller 816. The proximity controller 814 is connected to the proximity electrodes 806 and can periodically scan the electrodes in order to detect a proximity of a user. The controller 814 may process the signals from the proximity electrodes 806 to detect proximity and provide an indication of the detected proximity to a host controller or the controller may pass the signals to another controller for further processing and determining if a user is in proximity. Similarly, the touch controller 816 may provide signals to, and monitor the signals from, the touch sensor electrodes 810. The controller may process the signals from the touch sensor electrodes 810 in order to determine a location of a user's touch or may pass the signals on to another controller for determining the location of the touch.

The touchscreen display assembly may require a calibration process in order to correlate locations of the touch sensor electrodes with locations on the display. The calibration process may present location to touch on the display and the resulting touch locations registered by the touch sensor may be calibrated to overlap with the presented location.

The above has described using the proximity sensor to detect a proximity of a user and power up meter components such as the display and touch sensor based on the detected proximity. Additionally, the proximity sensor may be used to detect non-touch gestures of the user, such as swiping up, down, left, right, etc. The detected gestures may be used as user input for controlling the parking meter, such as adding or removing time, proceeding to a next or previous screen of a user interface, etc.

The proximity sensor may use a low frequency, low power E-Field sensing components and control components to detect the approach/proximity of a user, hand/finger etc. The proximity sensor may continually monitor the electrodes for proximity and then wake other metering components when the proximity is detected. While using the proximity sensor in such a manner to wake other components can provide considerable power savings, as described further below, additional power savings may be achieved by periodically scanning the proximity electrodes until a user's proximity is detected.

Figure 9:
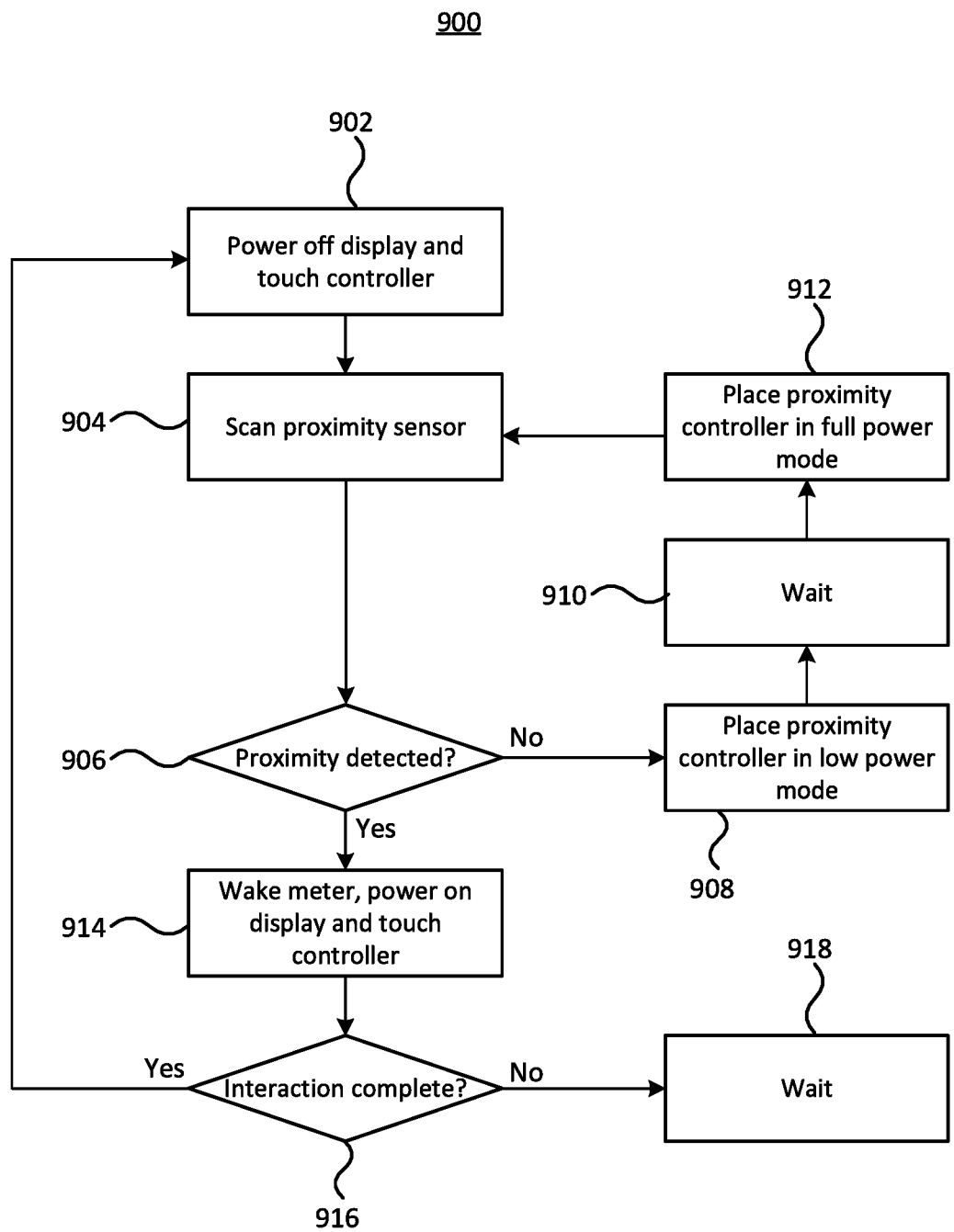
FIG. 9 depicts a method of controlling the touchscreen display assembly.

FIG. 9 depicts a method of controlling the touchscreen display assembly. The method 900 periodically scans the proximity sensor to detect a user's proximity in a low power way. The method 900 may begin with powering off the display and touch controller (902) as well powering off or down other meter components. For example, the main controller, radios payment devices or other components may be powered down to conserve energy. Once the display and touch sensor are powered down, the periodic scanning of the proximity sensor (904) may begin, and if no proximity is detected by the scan (No at 906) the proximity sensor can be placed in a low power mode (908) in which it is not scanning or monitoring the proximity electrodes. After powering down the proximity controller, the process waits (910) for a set period of time. The length of time to wait is a trade-off between power savings, that is the longer the wait the more the power savings, and usability, that is detecting the proximity of the user without a long delay. The wait time may be for example 0.1 seconds although the wait time may change based on what is acceptable for the trade-off between power and usability. After waiting for the wait time, the proximity controller is placed in the high power mode (912) and the proximity sensor, or electrodes, scanned (904) to determine if a user is in proximity. If a user's proximity is detected (Yes at 906) the meter may be placed in a wake state and the display and touch sensor powered on (914). Once in the wake state the meter may present the user with a graphical user interface for interacting with the parking meter. The method determines if the interaction is complete (916), which may be determined based on various events, such as receiving or completing payment, or a period of time passing without there being any user activity. If the interaction is complete (Yes at 916) the meter may be powered down or placed in a sleep state including powering off the display and touch sensor (902) otherwise (No at 916) the meter may wait (918) until the interaction is completed.

Figure 10:
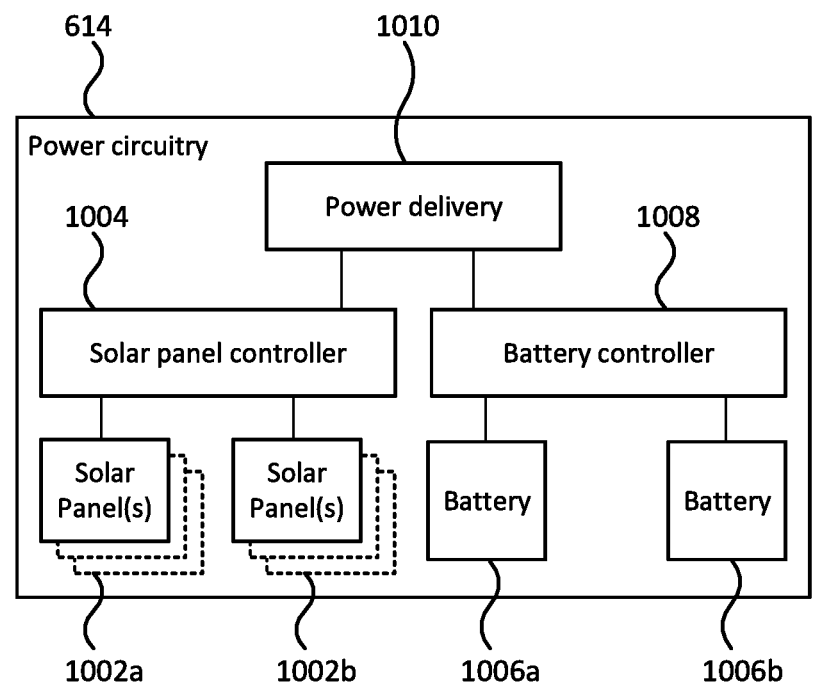
FIG. 10 depicts power circuitry components of a parking meter incorporating a plurality of solar panels.

FIG. 10 depicts power circuitry components of a parking meter incorporating a plurality of solar panels. The power circuitry 614 provides the required power to the parking meter components as well as controlling other power related functionality such as controlling operation of the solar panels as well as charging batteries. The power circuitry 614 may include a plurality of solar panels 1002a, 1002b. The plurality of solar panels may be arranged in a plurality of independent groups. Solar panels of one of the groups may be connected together in serial and/or parallel. The individual groups of solar panels 1002a, 1002b may be controlled individually by a solar panel controller 1004. Controlling the solar panel groups individually may allow the groups of solar panels to operate at the ideal operating parameters of the solar panel group. For example, if one group of solar panels is shaded, while another group is in direct sun, the two groups may operate at different parameters to ensure each group can output its maximum amount of power instead of operating at the parameters of the shaded solar panel.

The solar panel controller 1004 may control each independent grouping of solar panels using, for example, maximum power point tracking (MPPT) functionality. The solar panel controller 1004 may also control electrically connecting/disconnecting groups of solar panels based on whether or not the panels are producing a harvestable amount of energy. For example, the solar panel controller 1004 may continuously monitor the electrical energy or power level present on each of the PV solar panel groups and if the energy level on any given PV solar panel group is above a specific level indicative of the solar panel group being sufficiently illuminated by sunlight to produce harvestable energy the controller may electrically connect the PV panels of the group to MPPT controller functionality. If the solar panel controller detected multiple panels as producing harvestable energy at the same time it may electrically connect those multiple PV panels to the MPPT in a parallel arrangement, potentially dynamically increasing the harvestable power available to the MPPT controller. The PV panel with the lowest voltage rating will determine the maximum possible power that might be obtained in the parallel arrangement with mismatched PV panels under full sunlight. As any one of the multiple PV panels attached to the exterior of the meter becomes shaded as a result of the movement of the sun across the sky, the drop in output energy would be detected by the solar panel controller and that particular solar panel would be disconnected from the MPPT controller so as to keep only energy producing solar panels connected to the MPPT controller. Although not necessary, it may be desirable that all of the solar panels have the same voltage and current ratings. If it is not possible for all PV panels connected to the exterior of the meter to have the same voltage and current rating, the total additional power resulting from multiple PV panels being placed in parallel with each other by the solar panel controller will less than if all PV panels had identical voltage and current ratings.

The above has described connecting/disconnecting groups of solar panels in parallel to MPPT functionality. It is possible to include multiple instances of the MPPT functionality to control each group of solar panels independently at the panels optimum power output. The power output by the solar panels through the solar panel controller 1004 may be used to charge one or more rechargeable batteries 1006a, 1006b of the parking meter. The power circuitry 614 may include a battery controller 1008 that controls the charging of the batteries. For example the battery controller 1008 may control the voltage/current supplied to the batteries when charging. The battery controller 1008 may provide various functionality including for example balancing the individual cells of the batteries being charged.

The power output from the batteries, and possibly from the solar panel controller may be supplied to the power delivery functionality 1010 that supplies the required voltages/current to parking meter components.

The above has described a parking meter incorporating a touchscreen display. While the touchscreen may provide a desirable user interface for certain applications, it may not be desirable in all applications. For example, a city or purchaser of parking meters may not wish to incur the additional costs associated with a current large touchscreen display. Additionally or alternatively, the power consumption required by current display technologies may not meet certain requirements of a city or purchased or parking meters. Additionally or alternatively, the operating parameters, such as temperature, durability, lifetime, etc. of a current display technology may not meet the current requirements of a city or purchaser of parking meters. Although a touchscreen display may not be preferred by a city or purchaser of parking meters at the time of purchasing new parking meters, it may nonetheless become desirable or preferred to them subsequent to the purchase. Such retrofitting of existing parking meters to incorporate new features typically requires replacing a parking meter unit that is enclosed within the existing parking meter housing which is retained. For example for single space parking meters, the retrofit may comprise fitting a new removable parking meter mechanism within the existing parking meter housing. As a further example, for multi-space parking meters, new parking meter components may be fitted to a door of the multi-space meter. While these retrofit applications may provide a helpful way to provide new parking meter functionality without having to replace all of the existing infrastructure, it is nonetheless desirable to provide a parking meter with a means for easily retrofitting the user interfaces, which may comprise for example replacing a display and keypad or buttons, with a touchscreen display.

Figure 11:
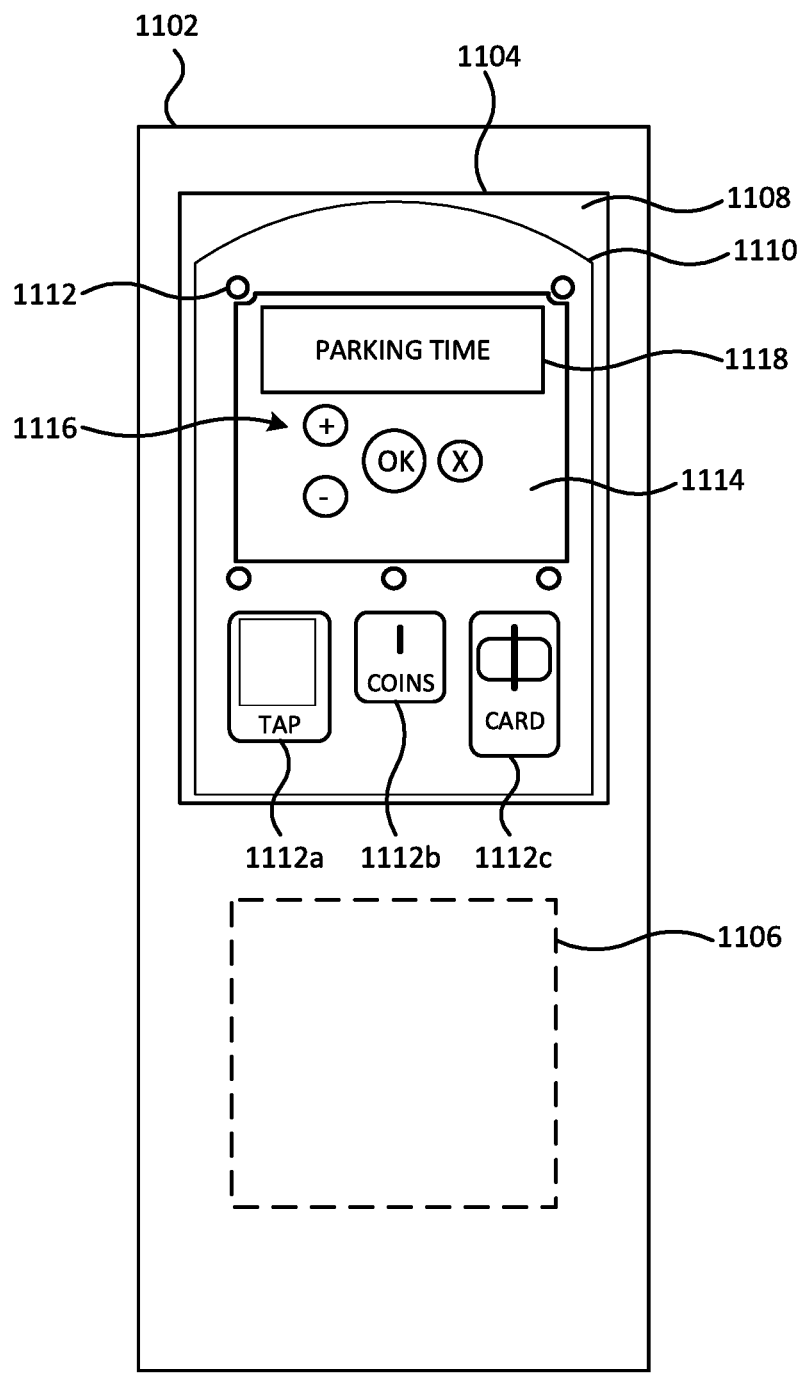
FIG. 11 depicts a parking meter providing an easily retrofitted user interface.

FIG. 11 depicts a parking meter providing an easily retrofitted user interface. The parking meter 1100 is depicted as a multi-space style parking meter. The parking meter 1100 comprises a cabinet 1102 that includes a hinged or removable door or panel 1104. The cabinet 1102 may also include a second door or panel 1106 which may be used for example to access a coin vault or other internal components. The door or panel 1104 may have a main door portion 1108 formed from a material such as stainless steel or other similar materials providing sufficient strength for protecting against vandalism. The door or panel 1104 portion 1108 may have a covering portion 1110 covered by a second material such as aluminum. The covering portion 1110 may cover a number of cutout sections within the main door portion 1108. The covering 1110 may be formed from an easily formed and/or machined material that can provide a precise fit around the components placed in cutouts of the main door portion 1108. For example, the main door portion 1108 may have a cutouts for receiving payment components such as a tap or contactless payment sensor 1112a, a coin chute 1112b and a card reader 1112c (referred to collectively as payment devices 1112). The cover 1110 may provide an aesthetically pleasing look to the parking meter door. The cover 1110 may be secured to the main door portion 1108 using one or more bolts or carriage bolts, one of which 1112 is labelled in FIG. 11. In addition to the cutouts for the payment devices 1112, the main door portion 1108 and the cover 1110 may have a cutout that receives a correspondingly sized panel insert 1114. The panel insert 1114 can be secured to the main door portion 1108 in various ways, one of which is further described with regard to FIGS. 13 and 14. The panel insert 1114 includes cutouts for user interface components including user interface components for input depicted as buttons 1116 and components for output depicted as display 1118. The panel insert 1114 allows the user interface components to be easily changed to new or different user interface components or configurations by simply replacing the insert panel 1114 instead of the entire panel door 1104.

Figure 12C:
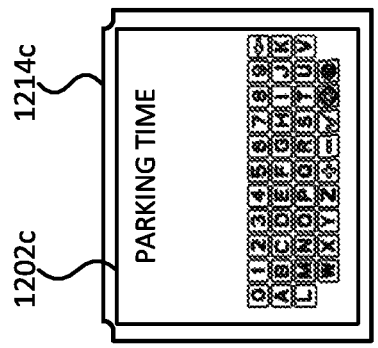
FIGS. 12A-12C depict retrofitted user interfaces of the parking meter of FIG. 11.
Figure 12B:
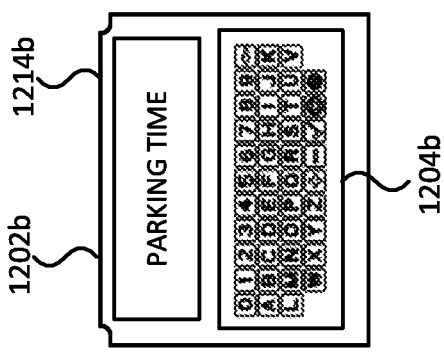
Figure 12A:
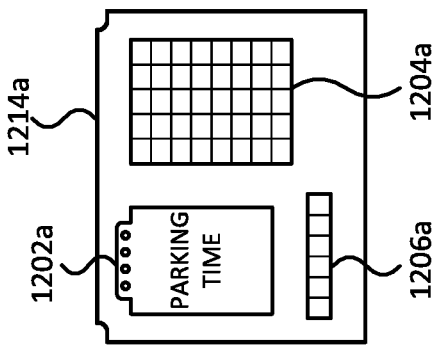

FIGS. 12A-12C depict various panel inserts for retrofitting user interfaces of the parking meter of FIG. 11. As depicted, each of the panel inserts 1214a, 1214b, 1214c has the same perimeter shape and size so that any one of the panel inserts 1214a, 1214b, 1214c can be received within the panel cutout of the main panel 1108 and cover 1110. Each of the panel inserts 1214a, 1214b, 1214c may have one or more cutouts providing arrangements of different user interface components. For example, the panel insert 1214a comprises cutouts for a display with a plurality of LED lights 1202a, a physical alphanumeric keypad 1204a and a physical keypad 1206. Panel insert 1214b may have cutouts for a display 1202b and a touchscreen keyboard 1204b and panel insert 1214c may have a single cutout for a touchscreen display 1202c. As will be appreciated, the parking meter with a panel cutout described above with reference to FIG. 11 may be easily upgraded or retrofitted with different user interface components such as the display, keyboard and keypad of insert panel 1214a, the display and touch screen keyboard of insert panel 1214b or the touchscreen display 1214c. Other arrangements of user interface components may be provided by different panel inserts.

Figure 13A:
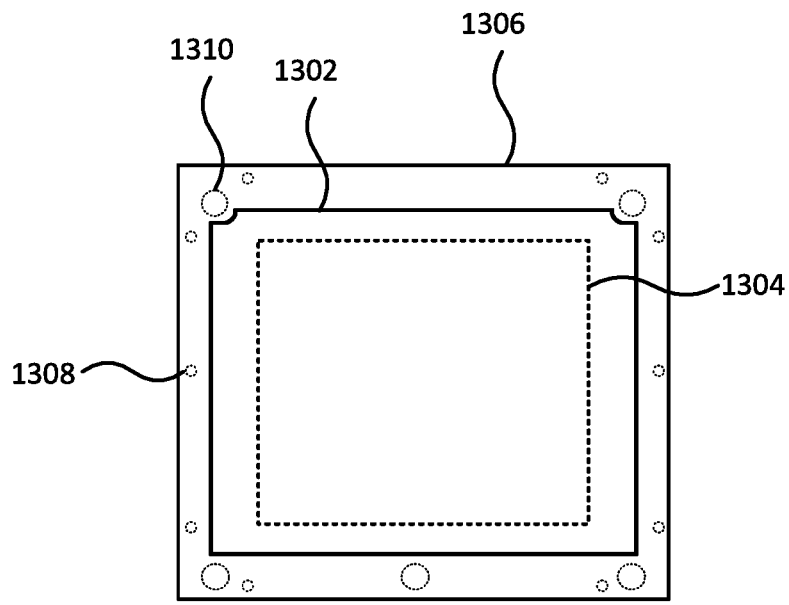
FIGS. 13A and 13B depict a top view and front view of an insert plate for a parking meter with an easily retrofitted user interface.
Figure 13B:
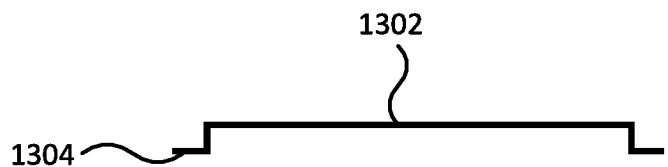

FIGS. 13A and 13B depict a top view and front view of an insert plate for a parking meter with an easily retrofitted user interface. The insert panel may have a raised panel portion 1302 that is sized to be received within the cutout of the main panel 1108 and the cover 1110 of the parking meter door of FIG. 11. The raised panel portion 1302 includes one or more cutouts 1304 which are arranged to locate the user interface components. The components may be secured to the back of the raised panel portion using bolts, studs, clips, or other features. In order to secure the panel insert within the corresponding cutout of the parking meter, the panel insert may have a flange 1306. The flange may have one or more holes 1308 through which bolts studs, etc. may be received to secure the insert panel. The flange may also include one or more relief cuts or cutouts 1310 for providing relied around features on the back of the main portion where the flange is seated. For example, the relief cutout 1310 may be a hole that allows the panel insert to be removed without having to first remove a carriage bolt and or nut used to secure the cover 1110 to the main portion 1108.

Figure 14:
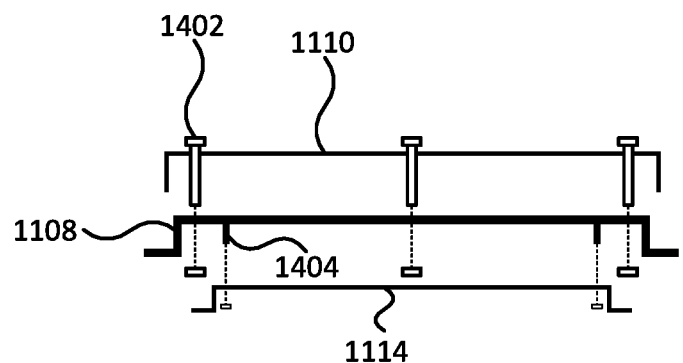
FIG. 14 depicts assembly of the easily retrofitted user interface of the parking meter of FIG. 11.

FIG. 14 depicts assembly of the easily retrofitted user interface of the parking meter of FIG. 11. As depicted, the cover 1110 may be secured to the main portion 1108 of the parking meter door by respective carriage bolts and nuts 1402 passing through the cover 1110 and the main portion 1108 and secured to the back of the main portion 1108. As described above with regard to FIG. 13, the flange of the insert panel 1114 may have relief cuts or cutouts around the nuts and bolts 1402 used to secure the cover 1110 to the main portion 1108. The back side of the main portion 1108 of the door may include one or more posts 1404 that are used to secure the insert panel to the main portion 1108. Although not depicted in FIG. 14, the inside of the panel insert may have one or more features used to secure the user interface components to the panel insert.

Although certain components and steps have been described, it is contemplated that individually described components, as well as steps, may be combined together into fewer components or steps or the steps may be performed sequentially, non-sequentially or concurrently. Further, although described above as occurring in a particular order, one of ordinary skill in the art having regard to the current teachings will appreciate that the particular order of certain steps relative to other steps may be changed. Similarly, individual components or steps may be provided by a plurality of components or steps. One of ordinary skill in the art having regard to the current teachings will appreciate that the components and processes described herein may be provided by various combinations of software, firmware and/or hardware, other than the specific implementations described herein as illustrative examples.

Numerous additional variations on the methods and apparatus of the various embodiments described above will be apparent to those skilled in the art in view of the above description. Such variations are to be considered within the scope.

What is claimed is:

1. A parking meter comprising:
    a meter housing;
    metering components within the meter housing, the metering components including a touchscreen assembly comprising:
        a display;
        a touch sensor overlaid on the display; and
        a low-power wake trigger comprising a secondary touch sensor overlaid on the touch sensor;
        wherein the secondary touch sensor is capable of providing an indication that a touch occurred without providing coordinates of the touch.

2. The parking meter of claim 1, wherein the metering components comprise at least one controller configured to turn on the display of the touchscreen assembly when the low-power wake trigger provides a wake signal.

3. The parking meter of claim 2, wherein the metering components comprise at least one controller configured to turn off the display of the touchscreen assembly after an inactivity period of time.

4. The parking meter of claim 3, wherein the at least one controller is further configured to turn on the touch sensor when the display is turned on and turn off the touch sensor when the display is turned off.

5. The parking meter of claim 1, wherein the metering components further comprise a solar panel attached at a first location of the parking meter.

6. The parking meter of claim 5, wherein the metering components further comprise an additional solar panel attached at a second location of the parking meter.

7. The parking meter of claim 6, wherein the metering components further comprise a solar panel controller for controlling operation of the solar panel and additional solar panel.

8. The parking meter of claim 7, wherein the solar panel controller independently controls the solar panel and additional solar panel.

9. The parking meter of claim 8, wherein the solar panel controller controls the solar panel and additional solar panel using maximum power point tracking functionality.

10. A parking meter comprising:
    metering components comprising:
        a display;
        a touch sensor overlaid on the display;
        a low-power wake trigger comprising a secondary touch sensor overlaid on the touch sensor,
        wherein the secondary touch sensor is capable of providing an indication that a touch occurred without providing coordinates of the touch;
    an insert housing comprising one or more openings for receiving respective user interface components;
    an external housing component enclosing the metering components, the external housing component comprising:
        at least one opening for a payment device; and
        at least one cutout for receiving the insert housing, wherein the insert is secured within the cutout of the external housing component,
    wherein the insert comprises a plurality of openings including a first opening for a display and a second opening for a keyboard or keypad, wherein the metering components include the display and keyboard or keypad.

11. The parking meter of claim 10, wherein the parking meter is a multi-space parking meter and the external housing component comprises a door panel of a cabinet of the multi-space parking meter.

12. The parking meter of claim 10, wherein the insert comprises a single opening for a touchscreen display, wherein the metering components include the touchscreen display.

13. The parking meter of claim 12, wherein the touchscreen display is part of a touchscreen display assembly comprising the touchscreen display.

14. The parking meter of claim 10, wherein the insert is secured within the cutout by bolts secured to an inside of the external housing.

15. The parking meter of claim 10, wherein the parking meter is a single space parking meter.

* * * * *